(12) United States Patent
Hiroe et al.

(10) Patent No.: US 8,758,884 B2
(45) Date of Patent: Jun. 24, 2014

(54) INSTRUMENT DISPLAY BOARD AND PROCESS FOR PRODUCING INSTRUMENT DISPLAY BOARD

(75) Inventors: Seiichi Hiroe, Sayama (JP); Katsuyuki Yamaguchi, Tokyo (JP); Hiroshi Ikebuchi, Kawasaki (JP); Taijiro Ito, Saitama (JP)

(73) Assignees: Citizen Holdings Co., Ltd., Tokyo (JP); Yamamoto Mfg. Co., Ltd., Tokyo (JP)

( * ) Notice: Subject to any disclaimer, the term of this patent is extended or adjusted under 35 U.S.C. 154(b) by 1518 days.

(21) Appl. No.: 11/910,187

(22) PCT Filed: Mar. 28, 2006

(86) PCT No.: PCT/JP2006/306367
§ 371 (c)(1),
(2), (4) Date: Sep. 28, 2007

(87) PCT Pub. No.: WO2006/106698
PCT Pub. Date: Oct. 12, 2006

(65) Prior Publication Data
US 2009/0268566 A1    Oct. 29, 2009

(30) Foreign Application Priority Data
Mar. 30, 2005   (JP) .................................. 2005-100196

(51) Int. Cl.
*G04C 17/00*   (2006.01)
(52) U.S. Cl.
USPC ........ 428/201; 428/195.1; 428/200; 368/223; 368/239
(58) Field of Classification Search
USPC ................ 428/195.1, 200, 201; 368/239, 223
See application file for complete search history.

(56) References Cited

U.S. PATENT DOCUMENTS 3,748,456 A * 7/1973 Brien .............................. 362/26
4,257,115 A * 3/1981 Hatuse et al. ................... 368/69
(Continued)

FOREIGN PATENT DOCUMENTS

| JP | 49034357 A | 3/1974 |
| JP | 4994664 A | 8/1974 |

(Continued)

OTHER PUBLICATIONS http://www.thefreedictionary.com/transparent.*

(Continued)

*Primary Examiner* — Mark Ruthkosky
*Assistant Examiner* — Christopher Polley
(74) *Attorney, Agent, or Firm* — The Webb Law Firm

(57) ABSTRACT

[Problem] An instrument display board is provided which does not need troublesome work for preparing plural plate members, can adopt a great variety of designs, can present a stereoscopic feeling and a high-class feeling, brings about unprecedented color tone variation, metallic texture, brilliancy in the light, etc., is very excellent in high-class feeling and design variation, has excellent appearance quality and therefore can enhance merchantability. A process for producing the instrument display board is provided.

[Solution means] The instrument display board includes a light-transmitting substrate, at least one partial print layer, a different-color print layer having a color tone different from that of the partial print layer, said partial print layer and said different-color print layer being provided on a back surface of the light-transmitting substrate, and a shield member that is provided at a position on a front surface of the light-transmitting substrate, said position corresponding to a position surrounding a part or the whole of the outer periphery of a print portion of the partial print layer. A portion of the light-transmitting substrate corresponding to the partial print layer is a transparent layer. The instrument display board can present a stereoscopic feeling without using plural plate members, brings about unprecedented color tone variation, metallic texture, brilliancy in the light, etc., is very excellent in high-class feeling and design variation, has excellent appearance quality and therefore can enhance merchantability. The process of the invention can produce the instrument display board.

20 Claims, 14 Drawing Sheets

(56) References Cited

U.S. PATENT DOCUMENTS

| | | | | |
|---|---|---|---|---|
| 4,603,065 A | * | 7/1986 | Mori et al. | 428/31 |
| 4,771,368 A | | 9/1988 | Tsukamoto et al. | |
| 4,875,433 A | * | 10/1989 | Tsukamoto | 116/335 |
| 5,266,427 A | * | 11/1993 | Iwase et al. | 430/15 |
| 5,966,344 A | * | 10/1999 | Umemoto et al. | 368/88 |
| 6,169,708 B1 | * | 1/2001 | Kaneko et al. | 368/84 |
| 6,199,996 B1 | | 3/2001 | Katrinecz, Jr. et al. | |

FOREIGN PATENT DOCUMENTS

| | | | |
|---|---|---|---|
| JP | 4013993 A | 1/1992 | |
| JP | 5026697 A | 2/1993 | |
| JP | 8109491 A | 4/1996 | |
| JP | 10253773 A | 9/1998 | |
| JP | 11052067 A | 2/1999 | |
| JP | 11153677 A | 6/1999 | |
| JP | 2001356719 A | 12/2001 | |
| JP | 6312788 A | 11/2007 | |
| WO | 9905233 A1 | 2/1999 | |

OTHER PUBLICATIONS http://replay.web.archive.org/20020913045744/http://www.color-wheel-pro.com/color-schemes.html.*

* cited by examiner

A-A (a)

(b)

(a)

(b)

A-A

A-A

PRIOR ART

PRIOR ART

INSTRUMENT DISPLAY BOARD AND PROCESS FOR PRODUCING INSTRUMENT DISPLAY BOARD

TECHNICAL FIELD

The present invention relates to instrument display boards (dials) arranged on the front surface sides (upper surface sides) of various instruments (e.g., meter panel of automobile).

The present invention also relates to time keeping instrument display boards (dials) arranged on the front surface sides (upper surface sides) of either solar cells (solar batteries) that are incorporated in time keeping instruments and are used for converting light energy to electric energy or electroluminescence (EL) for back light illumination incorporated in time keeping instruments, or both of them.

BACKGROUND ART

To instrument display boards (dials) arranged on the front surface sides (upper surface sides) of instruments, various characters, numerals, figures, etc. have been conventionally given.

Particularly to time keeping instrument display boards (dials) arranged on the front surface sides (upper surface sides) of time keeping instruments, plural characters, numerals, figures, etc. have been given. Also in time keeping instruments with solar cells (solar batteries), plural characters, numerals, figures, etc. are given to their display boards (dials), similarly to the above, and by combining them, enhancement of visibility and design properties, presentation of a high-class feeling, and the like are carried out.

In the case of such a time keeping instrument dial 100, for example, a method in which a sub-dial 104 is formed in one disc plate 102 by cutting as shown in FIG. 13 has been adopted as a prior art of a patent document 1.

In such a time keeping instrument dial 100, the sub-dial 104 is more depressed than other portions of the time keeping instrument dial 100, so that a stereoscopic feeling is presented by a difference in level between the sub-dial 104 and other portions of the time keeping instrument dial 100.

In the above method, however, there are problems such as restriction of a shape of the sub-dial 104 attributable to the cutting work and a large number of working steps. Moreover, there resides another problem that the time keeping instrument dial 100 must have a certain thickness.

On this account, in the case of a time keeping instrument dial 200 of the patent document 1 shown in FIG. 14, a method in which a lower plate 206 to constitute a sub-dial 204 and an upper plate 202 to constitute a dial base are manufactured in separate steps and they are superposed one upon another has been carried out.

According to such a method, the lower plate 206 to constitute the sub-dial 204 and the upper plate 202 to constitute the dial base are different members, so that a stereoscopic feeling can be presented, and besides, design properties can be enhanced by making the colors of the lower plate 206 and the upper plate 202 different from each other.

The display boards for time keeping instruments with solar cells and the display boards for time keeping instruments with backlight require light transmitting properties, and therefore, time keeping instrument display boards made from resin materials have been employed.

Also in the case of the display boards for time keeping instruments with solar cells and the display boards for time keeping instruments with backlight, which are made from resin materials, two different plates made from resin materials are bonded with an adhesive to form the time keeping instrument display boards, similarly to the time keeping instrument dial 200 shown in FIG. 14, and thereby a stereoscopic feeling can be presented and design properties can be enhanced.

Patent document 1: Japanese Utility Model Laid-Open Publication No. 94664/1974

DISCLOSURE OF THE INVENTION

Problem to be Solved by the Invention

In the time keeping instrument dial 200 formed by superposing the lower plate 206 and the upper plate 202 one upon another or the time keeping instrument display board formed by superposing two different plates made from resin materials one upon another, however, plural plate members are laminated in order to present a stereoscopic feeling, and because many members are used, troublesome working steps increase more and more. Hence, it has been desired to solve these problems.

The present invention has been made under such circumstances as described above, and it is an object of the present invention to provide an instrument display board which does not use plural plate members, reduces troublesome work, can present a stereoscopic feeling, brings about unprecedented color tone variation, metallic texture, brilliancy in the light, etc., is very excellent in high-class feeling and design variation, has excellent appearance quality and therefore can enhance merchantability, and a process for producing the instrument display board.

Means to Solve the Problem

In order to solve such problems associated with the prior art as mentioned above and attain the above object, the present invention has been made. The instrument display board of the present invention is an instrument display board comprising:

a light-transmitting substrate, at least one partial print layer, a different-color print layer having a color tone different from that of the partial print layer, said partial print layer and said different-color print layer being provided on a back surface of the light-transmitting substrate, and a shield member which is provided at a position on a front surface of the light-transmitting substrate, said position corresponding to a position surrounding a part or the whole of the outer periphery of a print portion of the partial print layer, wherein a portion of the light-transmitting substrate corresponding to the partial print layer is a transparent layer.

The process for producing an instrument display board of the present invention comprises:

a step of preparing a light-transmitting substrate at least a portion of which corresponding to a partial print layer is transparent, a step of forming at least one partial print layer on a back surface of the light-transmitting substrate, a step of forming a different-color print layer having a color tone different from that of the partial print layer on the back surface of the light-transmitting substrate, and a step of providing a shield member at a position on a front surface of the light-transmitting substrate, said position corresponding to a position surrounding a part or the whole of the outer periphery of a print portion of the partial print layer.

By adopting such constitution, at least the inside portion of the light-transmitting substrate surrounded by the shield member is a transparent layer when the instrument display board is viewed from above, and hence, the partial print layer provided on the back surface of the light-transmitting substrate is seen on the front surface of the light-transmitting substrate. Further, the shield member is provided on the front surface of the light-transmitting substrate, and the partial print layer is seen to be surrounded by the shield member, that is, the shield member could be seen as if it is stereoscopically formed, and a stereoscopic feeling can be presented.

Furthermore, the different-color print layer provided on the back surface of the light-transmitting substrate is seen outside the shield member by virtue of a difference in depth between the front surface and the back surface of the light-transmitting substrate and a difference in color between the different-color print layer and the partial print layer, and hence, a stereoscopic feeling of the shield member can be further presented.

Moreover, an instrument display board, which brings about unprecedented color tone variation, metallic texture, brilliancy in the light, etc., is very excellent in high-class feeling and design variation, has excellent appearance quality and therefore can enhance merchantability, can be provided.

In the instrument display board of the invention, the whole of the light-transmitting substrate is a transparent layer.

By adopting such constitution, the whole of the light-transmitting substrate is a transparent layer when the instrument display board is viewed from above, and hence, the partial print layer provided on the back surface of the light-transmitting substrate is seen on the front surface of the light-transmitting substrate. Further, the shield member is provided on the front surface of the light-transmitting substrate, and the partial print layer is seen to be surrounded by the shield member, that is, the shield member could be seen as if it is stereoscopically formed, and a stereoscopic feeling can be presented.

Furthermore, the different-color print layer provided on the back surface of the light-transmitting substrate is seen outside the shield member by virtue of a difference in depth between the front surface and the back surface of the light-transmitting substrate and a difference in color between the different-color print layer and the partial print layer, and hence, a stereoscopic feeling of the shield member can be further presented.

Moreover, an instrument display board, which brings about unprecedented color tone variation, metallic texture, brilliancy in the light, etc., is very excellent in high-class feeling and design variation, has excellent appearance quality and therefore can enhance merchantability, can be provided.

If the instrument display board of the invention is a display board of a time keeping instrument with a solar cell (solar battery), a prescribed light transmittance can be secured. That is, the display board has a light transmittance contributing to power generation of the solar cell, and the time keeping instrument can operate properly without the display board inhibiting the function of the solar cell time keeping instrument itself.

In the instrument display board of the invention, the transparent layer of the light-transmitting substrate is a colorless transparent layer.

If the light-transmitting substrate is a colorless transparent layer as above, the light-transmitting substrate is a colorless transparent layer when the instrument display board is viewed from above, and hence, the partial print layer provided on the back surface of the light-transmitting substrate is seen on the front surface of the light-transmitting substrate. Further, the shield member is provided on the front surface of the light-transmitting substrate, and the partial print layer is seen to be surrounded by the shield member, that is, the shield member could be seen as if it is stereoscopically formed, and a stereoscopic feeling can be presented.

Furthermore, the different-color print layer provided on the back surface of the light-transmitting substrate is seen outside the shield member by virtue of a difference in depth between the front surface and the back surface of the light-transmitting substrate and a difference in color between the different-color print layer and the partial print layer, and hence, a stereoscopic feeling of the shield member can be further presented.

Moreover, the partial print layer and the different-color print layer provided on the lower surface can be clearly seen from the upper surface of the instrument display board, and visibility can be enhanced.

Moreover, an instrument display board, which brings about unprecedented color tone variation, metallic texture, brilliancy in the light, etc., is very excellent in high-class feeling and design variation, has excellent appearance quality and therefore can enhance merchantability, can be provided.

In the instrument display board of the invention, the transparent layer of the light-transmitting substrate is a colored transparent layer.

If the light-transmitting substrate is a colored transparent layer as above, the light-transmitting substrate is a colored transparent layer when the instrument display board is viewed from above, and hence, the partial print layer provided on the back surface of the light-transmitting substrate is seen on the front surface of the light-transmitting substrate. Further, the shield member is provided on the front surface of the light-transmitting substrate, and the partial print layer is seen to be surrounded by the shield member, that is, the shield member could be seen as if it is stereoscopically formed, and a stereoscopic feeling can be presented.

Furthermore, the different-color print layer provided on the back surface of the light-transmitting substrate is seen outside the shield member by virtue of a difference in depth between the front surface and the back surface of the light-transmitting substrate and a difference in color tone between the different-color print layer and the partial print layer, and hence, a stereoscopic feeling of the shield member can be further presented.

Moreover, the partial print layer and the different-color print layer provided on the lower surface can be clearly seen from the upper surface of the instrument display board, and visibility can be enhanced.

Moreover, an instrument display board, which brings about unprecedented color tone variation, metallic texture, brilliancy in the light, etc., is very excellent in high-class feeling and design variation, has excellent appearance quality and therefore can enhance merchantability, can be provided.

Moreover, light-transmitting substrates having various colors can be produced, and besides, by variously combining the partial print layer with the colored transparent layer, a variety of expressions become possible, so that instrument display boards of a great number of variations can be provided.

In the instrument display board of the invention, on the upper surface of the light-transmitting substrate that is the transparent layer, a transparent layer having a color tone different from that of the above transparent layer is partially provided.

For example, if the light-transmitting substrate is composed of a colorless transparent layer and if a colored transparent layer is formed at a position on the upper surface of the substrate corresponding to the partial print layer that is in sight when the light-transmitting substrate is viewed from above, the partial print layer formed on the back surface of the colorless transparent layer and the colored transparent layer overlap each other, and a novel color tone is brought about.

It is also possible that the light-transmitting substrate is composed of a colorless transparent layer and that a colored transparent layer is formed at a portion on the upper surface of the substrate other than a portion corresponding to the partial print layer that is in sight when the light-transmitting substrate is viewed from above.

It is also possible that the light-transmitting substrate is composed of a colorless transparent layer or a colored transparent layer and that a colored transparent layer having a color tone different from that of the partial print layer is formed at a position on the upper surface of the substrate partially corresponding to the partial print layer that is in sight when the light-transmitting substrate is viewed from above.

It is also possible that the light-transmitting substrate is composed of a colored transparent layer and that a colored transparent layer having a color tone different from that of the above colored transparent layer that is a base of the light-transmitting substrate is formed at a position on the upper surface of the substrate corresponding to the partial print layer that is in sight when the light-transmitting substrate is viewed from above.

As described above, by combining the partial print layer, the light-transmitting substrate composed of a transparent layer, and the transparent layer formed on the upper surface of the light-transmitting substrate, various expressions of color tones become possible, and instrument display boards of a great number of variations can be provided.

In the instrument display board of the invention, at least one pattern is provided on the front surface of the light-transmitting substrate.

If at least one pattern is provided on the front surface of the light-transmitting substrate as above, the partial print layer provided on the back surface of the light-transmitting substrate is seen on the front surface of the light-transmitting substrate when the instrument display board is viewed from above. Further, the shield member is provided on the front surface of the light-transmitting substrate, and the partial print layer is seen to be surrounded by the shield member, that is, the shield member could be seen as if it is stereoscopically formed, and a stereoscopic feeling can be presented.

Furthermore, when the pattern on the front surface of the light-transmitting substrate receives light, the light is reflected to give beautiful appearance, and depending upon the patterned or non-patterned portion, brilliancy of the front surface of the light-transmitting substrate varies when light is received. Therefore, a stereoscopic feeling can be presented also by this.

Moreover, the different-color print layer provided on the back surface of the light-transmitting substrate is seen outside the shield member by virtue of a difference in depth between the front surface and the back surface of the light-transmitting substrate and a difference in color tone between the different-color print layer and the partial print layer, and hence, a stereoscopic feeling of the shield member can be further presented.

By providing the pattern on the front surface of the light-transmitting substrate, an instrument display board, which brings about unprecedented color tone variation, metallic texture, brilliancy in the light, etc., is very excellent in high-class feeling and design variation, has excellent appearance quality and therefore can enhance merchantability, can be provided.

In the instrument display board of the invention, at least one pattern is provided on the back surface of the light-transmitting substrate.

If at least one pattern is provided on the back surface of the light-transmitting substrate as above, the partial print layer provided on the back surface of the light-transmitting substrate is seen on the front surface of the light-transmitting substrate when the instrument display board is viewed from above. Further, the shield member is provided on the front surface of the light-transmitting substrate, and the partial print layer is seen to be surrounded by the shield member, that is, the shield member could be seen as if it is stereoscopically formed, and a stereoscopic feeling can be presented.

Furthermore, when light strikes the pattern on the back surface of the light-transmitting substrate, the light is reflected at the deeper part of the light-transmitting substrate to give beautiful appearance, and depending upon the patterned or non-patterned portion, brilliancy of the surface of the light-transmitting substrate varies when light is received. Therefore, a stereoscopic feeling can be presented also by this.

By providing the pattern on the surface of the light-transmitting substrate, an instrument display board, which brings about unprecedented color tone variation, metallic texture, brilliancy in the light, etc., is very excellent in high-class feeling and design variation, has excellent appearance quality and therefore can enhance merchantability, can be provided.

In the instrument display board of the invention, the pattern provided on the light-transmitting substrate is a partial pattern provided on a part of the light-transmitting substrate.

If the partial pattern is provided on a part of the light-transmitting substrate as above, the partial print layer provided on the back surface of the light-transmitting substrate is seen on the front surface of the light-transmitting substrate when the instrument display board is viewed from above. Further, the shield member is provided on the front surface of the light-transmitting substrate, and the partial print layer is seen to be surrounded by the shield member, that is, the shield member could be seen as if it is stereoscopically formed, and a stereoscopic feeling can be presented.

Furthermore, when light strikes the pattern on the surface of the light-transmitting substrate, the light is reflected to give beautiful appearance, and depending upon the patterned or non-patterned portion, brilliancy of the surface of the light-transmitting substrate varies when light is received. Therefore, a stereoscopic feeling can be presented also by this.

By partially providing the pattern, the patterned portion and the non-patterned portion could be seen as if they have different heights from each other.

Moreover, the partial print layer provided on the back surface of the light-transmitting substrate is seen to be surrounded by the shield member provided on the front surface of the light-transmitting substrate, and the different-color print layer provided on the back surface of the light-transmitting substrate is seen outside the shield member. Hence, by virtue of a difference in depth between the front surface and the back surface of the light-transmitting substrate and a difference in color tone between the different-color print layer and the partial print layer, a stereoscopic feeling of the shield member can be presented.

By providing the partial pattern on a part of the surface of the light-transmitting substrate, an instrument display board, which brings about unprecedented color tone variation, metallic texture, brilliancy in the light, etc., is very excellent in high-class feeling and design variation, has excellent appearance quality and therefore can enhance merchantability, can be provided.

In the instrument display board of the invention, the partial pattern is provided at a portion corresponding to the partial print layer.

If the partial pattern is provided at a portion corresponding to the partial print layer provided on the back surface of the light-transmitting substrate as above, the partial print layer provided on the back surface of the light-transmitting substrate is seen on the front surface of the light-transmitting substrate when the instrument display board is viewed from above. Further, the shield member is provided on the front surface of the light-transmitting substrate, and the partial print layer is seen to be surrounded by the shield member, that is, depending upon the patterned or non-patterned portion, the shield member could be seen as if it is stereoscopically formed, and a stereoscopic feeling can be presented.

Furthermore, when light strikes the partial pattern on the surface of the light-transmitting substrate, the light is reflected to give beautiful appearance, and depending upon the pattered or non-patterned portion, brilliancy of the surface of the light-transmitting substrate varies when light is received. Therefore, a stereoscopic feeling can be presented also by this.

Moreover, if the partial pattern is provided at a portion corresponding to the partial print layer provided on the back surface of the light-transmitting substrate, an instrument display board, which brings about unprecedented color tone variation, metallic texture, brilliancy in the light, etc., is very excellent in high-class feeling and design variation, has excellent appearance quality and therefore can enhance merchantability, can be provided.

If the partial pattern is provided at a portion corresponding to the partial print layer and the different-color print layer provided on the back surface of the light-transmitting substrate, the partial print layer surrounded by the shield member can be made conspicuous, and hence, a stereoscopic feeling can be further presented.

In the instrument display board of the invention, the different-color print layer is provided so as to cover the partial print layer and other portion on the back surface of the light-transmitting substrate.

If the different-color print layer is provided so as to cover the partial print layer as above, a novel color is produced by overlapping of the partial print layer and the different-color print layer, and when the instrument display board is viewed from above, a stereoscopic feeling can be presented while contrast between colors is enjoyed.

Further, the thickness of a portion where the partial print layer and the different-color print layer overlap (particularly a portion surrounded by the shield member) and the thickness of a portion consisting solely of the different-color layer are different from each other. Therefore, when the light-transmitting substrate receives light, brilliancy of the light-transmitting substrate varies locally, and the shield member can be seen more stereoscopically.

In the instrument display board of the invention, the different-color print layer is provided at a portion other than the partial print layer on the back surface of the light-transmitting substrate.

By adopting such constitution, the difference between the partial print layer and the different-color print layer can be made clear, and when the instrument display board is viewed from above, the partial print layer surrounded by the shield member is seen emphatically. Therefore, a stereoscopic feeling can be further presented.

In the instrument display board of the invention, the different-color print layer is provided so as to be in contact with the outer periphery of the partial print layer on the back surface of the light-transmitting substrate.

By adopting such constitution, the difference in color between the partial print layer and the different-color print layer on the back surface of the light-transmitting substrate can be made conspicuous, and the boundary between the colors becomes clear. Therefore, presentation of a stereoscopic feeling by the shield member can be further made.

In the instrument display board of the invention, the color tone relationship between the partial print layer and the different-color print layer is a relationship of substantially complimentary colors.

By allowing the partial print layer and the different-color print layer to have such a relationship of substantially complimentary colors as the color tone relationship, the difference between the colors becomes clear, and the difference between the partial print layer and the different-color print layer can be made conspicuous.

Further, when the instrument display board is viewed from above, the partial print layer provided on the back surface of the light-transmitting substrate is seen to be surrounded by the shield member provided on the front surface of the light-transmitting substrate, and besides, the different-color print layer provided on the back surface of the light-transmitting substrate is seen outside the shield member. Hence, by virtue of a difference in depth between the front surface and the back surface of the light-transmitting substrate and a difference in color tone between the different-color print layer and the partial print layer, a stereoscopic feeling of the shield member can be presented.

Furthermore, an instrument display board, which brings about unprecedented color tone variation, metallic texture, brilliancy in the light, etc., is very excellent in high-class feeling and design variation, has excellent appearance quality and therefore can enhance merchantability, can be provided.

In the instrument display board of the invention, the partial print layer has a metallic color tone.

If the partial print layer has a metallic color tone as above, light is reflected when light strikes the partial print layer, and beautiful appearance can be presented.

Further, by the synergistic effect with presentation of a stereoscopic feeling, an instrument display board having a more stereoscopic feeling can be provided.

Furthermore, an instrument display board, which brings about unprecedented color tone variation, metallic texture, brilliancy in the light, etc., is very excellent in high-class feeling and design variation, has excellent appearance quality and therefore can enhance merchantability, can be provided.

When the instrument display board is a time keeping instrument display board, information printed on the front surface of the light-transmitting substrate, such as numerals and characters, is conspicuously seen, and the information on the dial of the time keeping instrument can be surely transmitted to the viewer.

In the instrument display board of the invention, the different-color print layer has a metallic color tone.

If the different-color print layer has a metallic color tone as above, light is reflected when light strikes the different-color print layer, and beautiful appearance can be presented.

Further, by the synergistic effect with presentation of a stereoscopic feeling, an instrument display board having a more stereoscopic feeling can be provided.

When the instrument display board is a time keeping instrument display board, information printed on the front surface of the light-transmitting substrate, such as numerals and characters, is conspicuously seen, and the information on the dial of the time keeping instrument can be surely transmitted to the viewer.

In the instrument display board of the invention, a display print layer is provided on the light-transmitting substrate.

If the display print layer is provided on the light-transmitting substrate as above, a variety of designs can be presented, and besides, necessary information can be surely transmitted to the user.

Further, by virtue of such a variety of designs, an instrument display board satisfying needs can be provided.

Furthermore, by the synergistic effect with presentation of a stereoscopic feeling, an instrument display board having a more stereoscopic feeling can be provided.

When the instrument display board is a time keeping instrument display board, information on the dial of the time keeping instrument can be surely provided to the viewer through the information printed on the display print layer, such as numerals and characters.

In the instrument display board of the invention, a display print layer is provided on the shield member.

If the display print layer is provided on the shield member as above, a variety of designs can be presented, and besides, necessary information can be surely transmitted to the user.

Further, by virtue of such a variety of designs, an instrument display board satisfying needs can be provided.

Furthermore, by the synergistic effect with presentation of a stereoscopic feeling, an instrument display board having a more stereoscopic feeling can be provided.

When the instrument display board is a time keeping instrument display board, information on the dial of the time keeping instrument can be surely provided to the viewer through the information printed on the display print layer, such as numerals and characters.

In the instrument display board of the invention, the display print layer is provided using inks of different color tones in such a manner that these inks partially overlap each other.

By adopting such constitution, the color difference between the inks looks like shade, and a stereoscopic feeling can be presented.

Further, because the inks overlap each other, a stereoscopic feeling can be presented.

When the instrument display board is a time keeping instrument display board, information printed on the display print layer, such as numerals and characters, is conspicuously seen, and the information on the dial of the time keeping instrument can be surely provided to the viewer.

In the instrument display board of the invention, the display print layer is provided using inks of different color tones in such a manner that these inks are partially in contact with each other.

By adopting such constitution, the color difference between the inks looks like shade, and a stereoscopic feeling can be presented.

Further, because the inks overlap each other, a stereoscopic feeling can be presented.

Furthermore, because the inks having different color tones are in contact with each other, the boundary between the inks becomes conspicuous, and hence, an instrument display board having a clear display print layer can be provided.

When the instrument display board is a time keeping instrument display board, information printed on the display print layer, such as numerals and characters, is conspicuously seen, and the information on the dial of the time keeping instrument can be surely provided to the viewer.

In the instrument display board of the invention, a decorative film and the display print layer are provided on a surface of the shield member.

If the decorative film and the display print layer are provided on the surface of the shield member as above, the display print layer provided on the upper surface of the decorative film becomes conspicuous by virtue of a difference in color between the decorative film and the display print layer, and besides, novel contrast is produced, whereby design properties can be enhanced.

By virtue of the decorative film and the display print layer, the whole of the shield member becomes conspicuous, and therefore, a stereoscopic feeling of the shield member can be further presented.

If the decorative film has a color tone that easily reflects light, light is reflected by the decorative film provided on the surface of the shield member. Therefore, beautiful appearance is presented, and a high-class feeling can be presented.

When the instrument display board is a time keeping instrument display board, the decorative film on the surface of the shield member accentuates information printed on the display print layer, such as numerals and characters, and the information on the dial of the time keeping instrument can be surely provided to the viewer.

In the instrument display board of the invention, the shield member is formed from an ink film or a metal film.

If the shield member is formed from an ink film or a metal film as above, troublesome work to newly prepare a member is unnecessary, and therefore, cost can be reduced.

Further, if the ink film or the metal film is used, a complicated shape can be formed, and besides, painting with various colors becomes possible. Therefore, design properties can be greatly enhanced.

The shield member having greatly enhanced design properties is conspicuous, and therefore, a stereoscopic feeling is presented.

In the instrument display board of the invention, the shield member is formed by an electrodeposition method.

By using the electrodeposition method as above, a shield member having a complicated shape can be formed, and besides, a highly precise shield member can be formed. Therefore, design properties can be greatly enhanced, and character information on the instruments can be surely provided to the viewer.

Further, troublesome work to newly prepare a member becomes unnecessary, and therefore, cost can be reduced.

Furthermore, even in the case of an instrument display board that is used for watches requiring precision, beautiful appearance, delicacy, etc., the shield member can be surely electrodeposited onto the light-transmitting substrate, and a stereoscopic feeling can be presented.

In the instrument display board of the invention, the shield member is formed by outline blanking or chemical etching of a metal plate.

By adopting such constitution, an instrument display board that is used for watches requiring precision, beautiful appearance, delicacy, etc. can be surely produced, and besides, a stereoscopic feeling can be effectively presented.

When the shield member is formed by outline blanking of a metal plate, the shield member can be produced by a pressing machine only, and therefore, production cost can be held down.

When the shield member is formed by chemical etching, a great number (e.g., 200) of shield members can be produced at the same time.

In the instrument display board of the invention, the thickness of the shield member is in the range of 0.03 μm to 50 μm.

Even if the thickness of the shield member is as small as 0.03 μm to 50 μm as above, a stereoscopic feeling of the shield member can be presented by virtue of synergistic effect of the light-transmitting substrate, the shield member which is provided on the upper surface of the light-transmitting substrate and the partial print layer which is provided on the back surface of the light-transmitting substrate and is seen inside the shield member when the instrument display board is viewed from above.

In the instrument display board of the invention, the shield member is fixed to the front surface of the light-transmitting substrate through an adhesive or a pressure-sensitive adhesive.

By using the adhesive or the pressure-sensitive adhesive as above, the shield member can be surely bonded to the front surface of the light-transmitting substrate.

Further, even if the instrument display board is used for a watch that is used in a particularly severe operating environment, a cause of trouble can be surely prevented from occurring because the shield member is firmly bonded to the light-transmitting substrate.

The time keeping instrument display board of the present invention uses the instrument display board as a time keeping instrument display board.

If the instrument display board is used as the time keeping instrument display board as above, a time keeping instrument display board having high design properties, showing a stereoscopic feeling and a high-class feeling and having excellent visibility can be provided.

Further, if the instrument display board is used as a display board for solar cell time keeping instruments using solar cells, a prescribed light transmittance can be secured without fail. That is, the display board has a light transmittance contributing to power generation of the solar cell, and the time keeping instrument can operate properly without the display board inhibiting the function of the solar cell time keeping instrument itself.

Furthermore, information consisting of numerals and characters on the time keeping instrument display board can be surely provided to the viewer, and because the shield member is stereoscopically seen by the above-mentioned various actions, a time keeping instrument display board having excellent visibility and excellent design properties can be provided.

Effect of the Invention

According to the present invention, an instrument display board, which does not need troublesome work for preparing plural plate members, can adopt a great variety of designs, can present a stereoscopic feeling and a high-class feeling, brings about unprecedented color tone variation, metallic texture, brilliancy in the light, etc., is very excellent in high-class feeling and design variation, has excellent appearance quality and therefore can enhance merchantability, and a process for producing the instrument display board can be provided.

DESCRIPTION OF SYMBOLS

Figure 1:
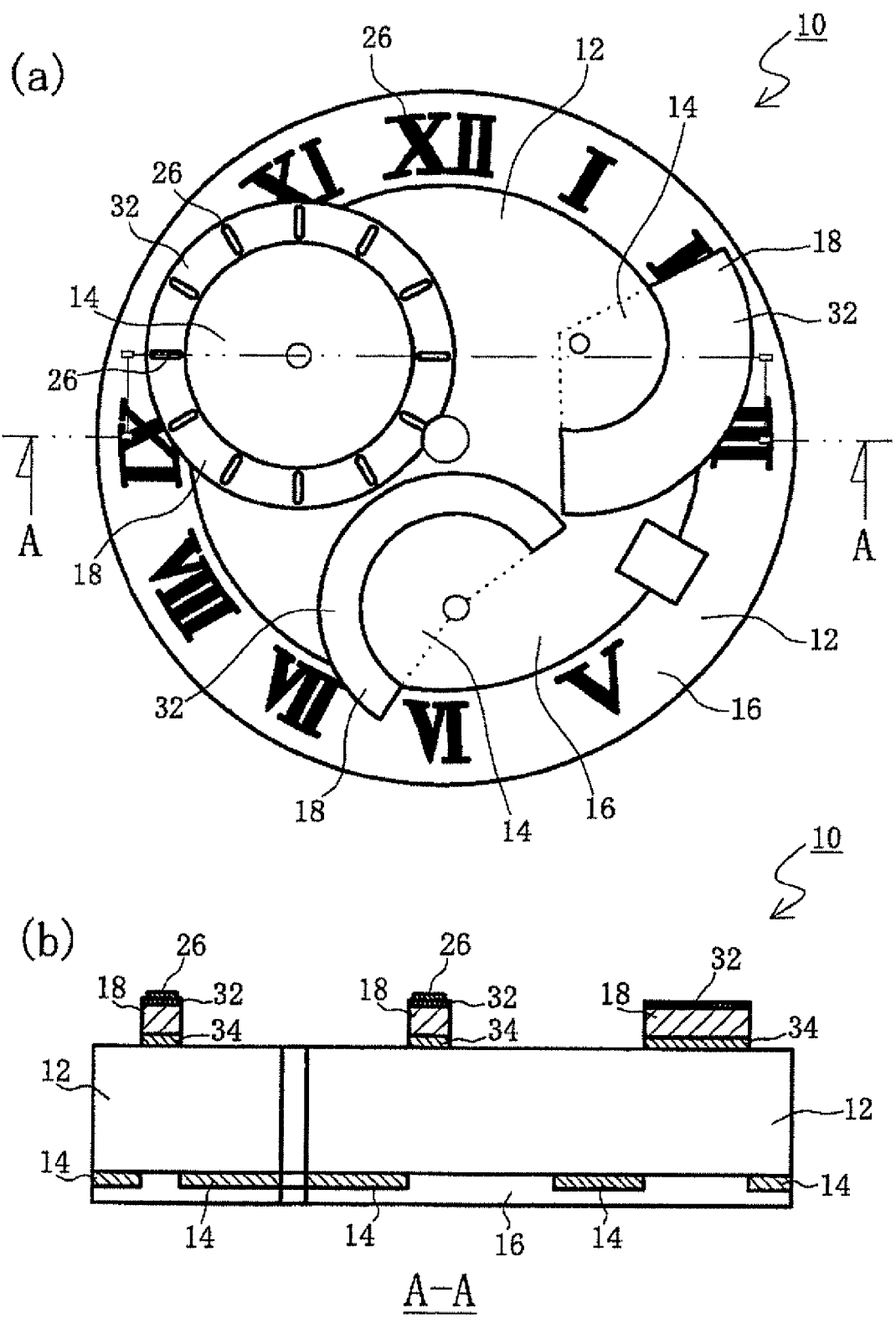
FIG. 1(a) is a schematic front view of an instrument display board that is a first embodiment of the present invention.
FIG. 1(b) is a sectional view taken on line A-A of FIG. 1(a).

10: instrument display board
12: light-transmitting substrate
12a: colorless transparent layer
12b: colored transparent layer
14: partial print layer
16: different-color print layer
18: shield member
20: pattern
22: pattern
24: pattern
26: display print layer
28: ink
30: ink
32: decorative film
34: adhesive
36: light-reflecting powder
50: hue circle
52: red
54: reddish orange
56: yellowish orange
58: yellow
60: yellowish green
62: green
64: greenish blue
66: bluish green
68: blue 70: bluish purple
72: purple
74: reddish purple
100: time keeping instrument dial
102: disc plate
104: sub-dial
200: time keeping instrument dial
202: upper plate
204: sub-dial
206: lower plate

BEST MODE FOR CARRING OUT THE INVENTION

Some embodiments (examples) of the present invention are described in detail hereinafter with reference to the drawings.

FIG. 1(a) is a schematic front view of an instrument display board that is a first embodiment of the present invention, and FIG. 1(b) is a sectional view taken on line A-A of FIG. 1(a). FIG. 2 is a view of a hue circle to explain a relationship between a partial print layer and a different-color print layer of an instrument display board that is a first embodiment of the present invention.

As shown in FIG. 1(a) and FIG. 1(b), numeral 10 designates the whole of an instrument display board of the present invention.

In all of the following embodiments, the instrument display board of the invention is applied to a solar cell time keeping instrument display board and its description is made, but in addition thereto, the instrument display board of the invention is applicable to display boards for all sorts of instruments, such as display boards for various instruments (e.g., meter panel of automobile), display boards for time keeping instruments, display boards for radio controlled time keeping instruments, display boards for desk clocks and display boards for wall clocks.

As shown in FIG. 1(a) and FIG. 1(b), the instrument display board 10 comprises, as a base, a light-transmitting substrate 12 made from a resin capable of transmitting light.

On the back surface of the light-transmitting substrate 12, a partial print layer 14 is partially provided.

Further, a different-color print layer 16 is superposed on the partial print layer 14, and this different-color print layer 16 is provided over the whole surface of the light-transmitting substrate 12.

On the other hand, on the front surface of the light-transmitting substrate 12, a shield member 18 having a shape of a ring or such a shape as is obtained by partially cutting a ring is provided through an adhesive 34.

On the upper surface of the shield member 18, a decorative film 32 having a metallic luster is provided, and thereon, a display print layer 26 consisting of characters, symbols, etc. is printed, when necessary.

The partial print layer 14 and the shield member 18 have such a positional relationship that the partial print layer 14 is seen on the inner peripheral side of the shield member 18 when the instrument display board 10 is viewed from above.

The partial print layer 14 and the shield member 18 are provided on the back surface and the front surface of the light-transmitting substrate 12, respectively, interposing the light-transmitting substrate 12. Therefore, when the instrument display board 10 is viewed from above, the partial print layer 14 is seen at a position deeper than that of the inner peripheral side of the shield member 18, and as a result, the shield member 18 can be stereoscopically seen on the front surface of the light-transmitting substrate 12.

The different-color print layer 16 provided on the back surface of the instrument display board 10 has a color tone different from that of the partial print layer 14 which is seen on the inner peripheral side of the shield member 18 when the instrument display board 10 is viewed from above. Therefore, the inside and the outside of the shield member 18 differ from each other in color, and hence, the shield member is seen more stereoscopically on the front surface of the light-transmitting substrate 12.

Such a light-transmitting substrate 12 that is a core of the instrument display board 10 generally comprises, as its base material, a synthetic resin.

The synthetic resin to constitute the base material of the light-transmitting substrate 12 is preferably at least one resin selected from polycarbonate resin, acrylic resin, polyacetal resin, ABS resin, polyethylene resin, polypropylene resin, polystyrene resin and polyethylene terephthalate resin.

Such a light-transmitting substrate 12 is produced by injection molding, and this substrate 12 has only to be produced in a given size by outline blanking according to the sizes of various instruments such as watches. The thickness of the light-transmitting substrate 12 is preferably in the range of 300 to 500 μm.

For the light-transmitting substrate 12, a so-called polymer alloy obtained by blending different kinds of resins may be used, and for example, a polymer alloy composed of a combination of at least two kinds of resins selected from polycarbonate resin, acrylic resin, polyacetal resin, ABS resin, polyethylene resin, polypropylene resin, polystyrene resin and polyethylene terephthalate resin is employable.

In this case, the blending ratio between the resins can be properly changed taking into account moldability, treating properties in surface treatment such as metal plating, hygroscopicity, etc., and is not specifically restricted. For example, in the case where the polycarbonate resin is used as a main component resin and the ABS resin is used as a sub-resin, properties of the ABS resin, such as surface treating properties and moldability, are exhibited. Therefore, the amount of the ABS resin can be properly changed, and for example, it is 20% by weight based on the main resin.

As an example of the polymer alloy, "Dia-Alloy" (trade name, available from Mitsubishi Rayon Co., Ltd.) is employable.

Also in this case, the light-transmitting substrate 12 is produced by injection molding, and it has only to be produced in a given size by outline blanking according to the sizes of various instruments. The thickness of the light-transmitting substrate 12 is preferably in the range of 300 to 500 μm.

By the use of such a polymer alloy, enhancement of adhesion to the display print layer 26 or the shield member 18, surface treating properties, moldability, hygroscopicity, etc. becomes possible.

In the light-transmitting substrate 12, the base material itself of the light-transmitting substrate 12 can contain usual pigment and dye.

Although the pigment and the dye are not specifically restricted, titanium oxide can be contained as a white pigment, and red iron oxide (ferric oxide) can be contained as a red pigment.

Such a raw material is contained in an amount of preferably 0.5 to 3.5% by weight based on the base material of the light-transmitting substrate 12.

In the case where the light-transmitting substrate 12 is a transparent layer, if a pigment or a dye is added to the light-transmitting substrate 12 as above, the whole of the transparent layer can be changed to a colored transparent layer, or if printing is partially made, a colored transparent layer 12b can be formed. Therefore, an instrument display board 10 having excellent design variation and excellent appearance quality can be provided.

The partial print layer 14 on the back surface of the light-transmitting substrate 12 is provided at a position corresponding to the inside of the shield member 18 provided on the front surface of the light-transmitting substrate 12.

Over the partial print layer 14, further, a different-color print layer 16 having a color tone different from that of the partial print layer 14 is laminated.

The color tone relationship between the partial print layer 14 and the different-color print layer 16 is preferably such a relationship of complimentary colors that the colors of these layers are positioned on the opposite sides to each other interposing a neutral point that is present at the center of a circle in the publicly known hue circle 50 shown in FIG. 2.

The hue circle 50 is briefly described below. The hue circle 50 is a circle in which typical hues are systematically and circularly arranged, and in FIG. 2, a hue circle of Japanese Practical Color Coordinate System (P.C.C.S) is shown as an example.

In such a hue circle 50, purplish red is given hue No. 1, red is given hue No. 2, yellowish red is given hue No. 3, reddish orange is given hue No. 4, thus, a round is made toward yellow, green, blue, purple and reddish purple, and the final reddish purple is given hue No. 24.

The colors corresponding to the hue numbers are: red 52 that is hue No. 2, reddish orange 54, yellowish orange 56, yellow 58, yellowish green 60, green 62, greenish blue 64, bluish green 66, blue 68, bluish purple 70, purple 72 and reddish purple 74, and thus, they are designated by alternate numbers from red 52. A color between colors (color with an odd hue number) is an intermediate color therebetween.

In such a hue circle 50, colors at the opposite positions to each other (e.g., hue No. 20 and hue No. 8) have a relationship of complimentary colors, and the difference between the colors in the hue circle 50 is largest, so that the difference between the colors is clear.

By allowing the partial print layer 14 and the different-color print layer 16 of the instrument display board 10 of the invention to have the relationship of complimentary colors, the difference in color between the partial print layer 14 and the different-color print layer 16 becomes clear. Accordingly, by the synergistic effect of the action of the complimentary color relationship between the partial print layer 14 and the different-color print layer 16, the colors being different between the inside and the outside of the shield member 18, the difference in level between the front surface and the back surface of the light-transmitting substrate 12 attributable to the thickness of the light-transmitting substrate 12, the conspicuousness of the partial print layer 14 due to the shield member 18, etc., the shield member 18 is presented stereoscopically, and an instrument display board 10, which brings about unprecedented color tone variation, metallic texture, brilliancy in the light, etc., is very excellent in high-class feeling and design variation, has excellent appearance quality and therefore can enhance merchantability, can be provided.

The color tone relationship between the partial print layer 14 and the different-color print layer 16 is not limited to the above relationship, and for example, by adopting an approximate complimentary color relationship (e.g., hue No. 8 and hue No. 19 or 21) close to the complimentary color relationship or a different-color density relationship in which color density is partially changed, a stereoscopic feeling can be imparted to the instrument display board 10 of the invention.

The partial print layer 14 and the different-color print layer 16 are desirably formed from an ink or a coating material.

In this case, the base material of the ink or the coating material is desirably composed of at least one resin selected from alkyd resin, acrylic resin, vinyl chloride resin, urethane resin and polyester resin, or a modified resin thereof.

By forming the partial print layer 14 and the different-color print layer 16 from an ink or a coating material as above, a color tone can be imparted thereto, and besides, the partial print layer 14 and the different-color print layer 16 can be readily formed on the lower surface side of the light-transmitting substrate 12 by, for example, screen printing.

The thickness of the partial print layer 14 and the different-color print layer 16 formed on the lower surface side of the light-transmitting substrate 12 is desirably in the range of 5 to 15 μm.

On the other hand, the shield member 18 provided on the front surface of the light-transmitting substrate 12 through the adhesive 34 is preferably formed by an electrodeposition method (electroforming method), or outline blanking or chemical etching of a metal plate.

In particular, the electrodeposition method (electroforming method) is a technique to form a part on a surface of a matrix by electrodeposition and is a method in which a shield member 18 having the same shape and the same size as those of the matrix can be obtained by electrolysis of a metal salt solution through the same operation as that of electroplating.

The shield member 18 can be formed also from an ink film.

Such an ink film is produced by screen printing, pad printing or the like using an ink that is properly selected from inks of various color tones.

The shield member 18 can be formed also from a metal film.

Such a metal film is desirably a metal film or a metal oxide film, and is desirably a metal film or a metal oxide film having a light refractive index different from that of the light-transmitting substrate 12.

By making the light refractive index of the metal film or the metal oxide film formed on the upper surface side of the light-transmitting substrate 12 and the light refractive index of the light-transmitting substrate 12 different from each other, the color tone and the metallic texture vary depending upon the viewer's viewing angle, and an instrument display board 10 having unprecedented original design can be provided.

The metal film or the metal oxide film provided on the front surface of the light-transmitting substrate 12 can be formed from a single-layer metal film or metal oxide film.

By forming the metal film or the metal oxide film on the front surface of the light-transmitting substrate 12 from a single-layer metal film or metal oxide film, a shield member 18 having an unprecedented metallic texture can be given to the instrument display board 10.

In this case, the film thickness of the single-layer metal film or metal oxide film formed on the front surface of the light-transmitting substrate 12 is desirably in the range of 300 to 1000 Å.

By changing the film thickness of the single-layer metal film or metal oxide film in the above range, various metallic colors can be obtained and light transmittance can be changed even in the case of the same single-layer metal films or metal oxide films.

Further, the metal film or the metal oxide film on the front surface of the light-transmitting substrate 12 can be formed by laminating plural metal films or metal oxide films.

By forming the metal film or the metal oxide film on the front surface of the light transmitting substrate 12 using plural metal films or metal oxide films as above, metallic textures of the individual metal films or metal oxide films are combined, and hence, a shield member 18 having an unprecedented original metallic texture can be given to the instrument display board 10.

In this case, the plural metal films or metal oxide films desirably have different light refractive indexes from one another.

By making the light refractive indexes of the plural metal films or metal oxide films different from one another, different color tones, pearly lusters and metallic textures of the individual metal films or metal oxide films are obtained depending upon the viewer's viewing angle, and an instrument display board 10 having unprecedented original design can be provided.

In this case, the thickness of each of the plural metal films or metal oxide films laminated on the upper surface side of the light-transmitting substrate 12 is desirably in the range of 300 to 1000 Å.

By changing the thickness of each of the thus laminated plural metal films or metal oxide films in the above range, various metallic colors can be obtained and light transmittance can be changed even in the case where the thus laminated plural metal films or metal oxide films are the same as one another.

In this case, the metal film provided on the front surface of the light-transmitting substrate 12 can be composed of one metal selected from Au, Ag, Al, Cu, Co, Cr, Fe, In, Ni, Pd, Pt, Rh, Sn and Ti or an alloy of two or more metals selected from these metals.

For example, Au—Ag, Au—Cu, Au—Ni, Ag—Pd, Au—Al, Cu—Al, Au—Cr, Au—Co, Au—In and Pd—Ni are employable as binary alloys, and Au—Cu—Pd, Au—Ag—Cu and Au—In—Co are employable as ternary alloys.

By using the binary alloy or the ternary alloy as above, various metallic colors that are never given by single metals can be obtained, and hence, design variation is widened.

For example, the Au—Ag alloy brings about a yellow gold color, and the Au—Cu alloy brings about a red gold color.

The metal oxide film provided on the front surface of the light-transmitting substrate 12 can be composed of at least one metal oxide selected from silicon oxide, titanium oxide, zirconium oxide, aluminum oxide, iron oxide and tin oxide.

The metal film or the metal oxide film provided on the front surface of the light-transmitting substrate 12 is desirably formed by a dry plating method, such as deposition, sputtering or ion plating.

On the front surface of the light-transmitting substrate 12, a display print layer 26 is formed in addition to the shield member 18 bonded through the adhesive 34.

Such a display print layer 26 is provided in a desired design on the front surface of the light-transmitting substrate 12 by means of pad printing.

By constituting the instrument display board 10 of the invention in the above manner, an instrument display board 10 which does not need troublesome work for preparing plural plate members, can adopt a great variety of designs, can present a stereoscopic feeling, brings about unprecedented color tone variation, metallic texture, brilliancy in the light, etc., is very excellent in high-class feeling and design variation, has excellent appearance quality and therefore can enhance merchantability, and a process for producing the instrument display board 10 can be provided.

FIG. 3(a) is a schematic front view showing another embodiment of the instrument display board 10 of the invention, and FIG. 3(b) is a sectional view taken on line A-A of FIG. 3(a).

Figure 2:
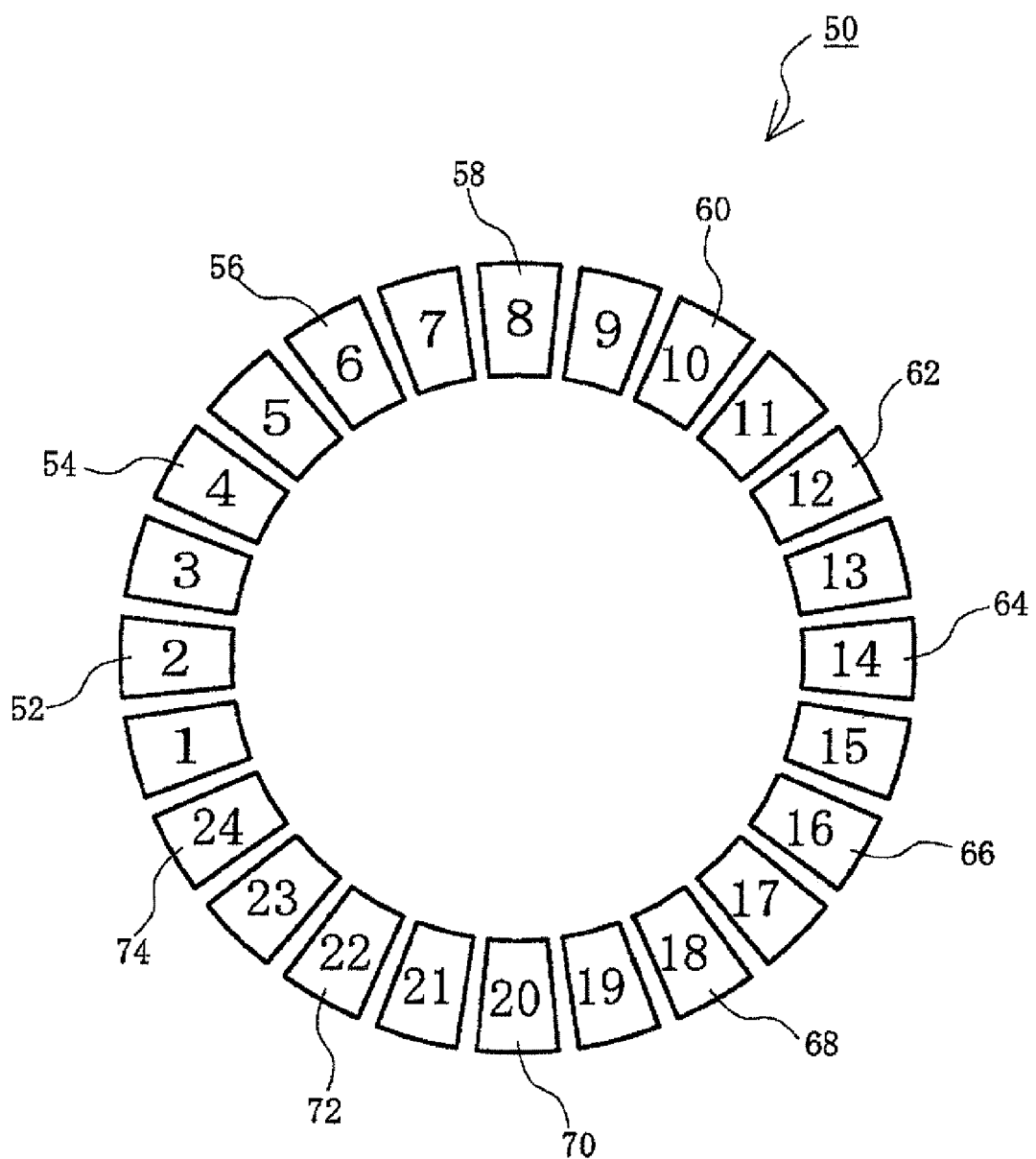
FIG. 2 is a view of a hue circle used for explaining a relationship between a partial print layer and a different-color print layer of an instrument display board that is a first embodiment of the present invention.
Figure 3:
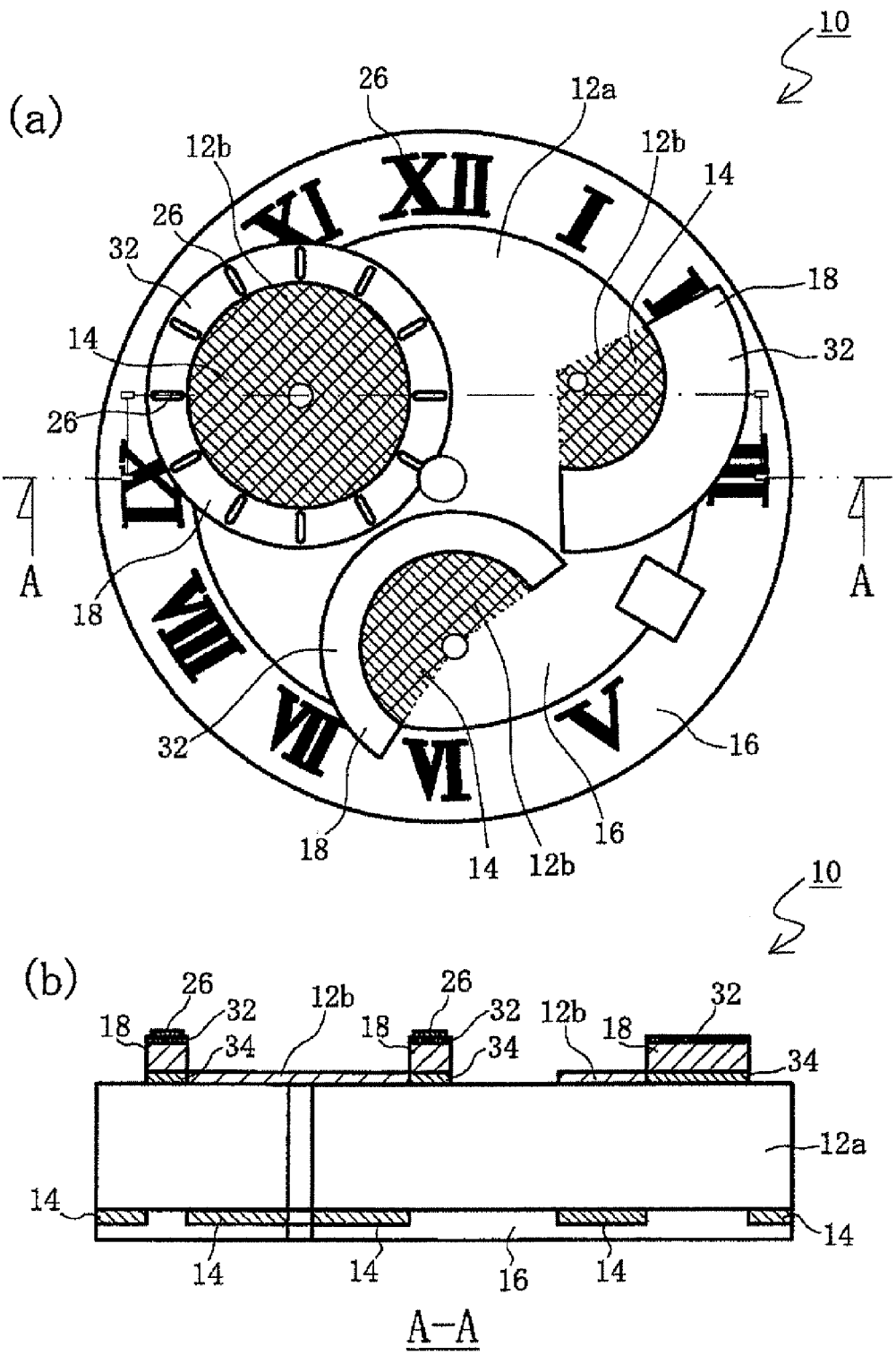
FIG. 3(a) is a schematic front view of an instrument display board that is another embodiment of the present invention.
FIG. 3(b) is a sectional view taken on line A-A of FIG. 3(a).

The instrument display board 10 of FIG. 3 basically has the same constitution as that of the instrument display board 10 of the embodiment shown in FIG. 1, so that like constituent members are given like reference numerals, and their detailed descriptions are omitted.

In the instrument display board 10, the light-transmitting substrate 12 is composed of a colorless transparent layer 12a, and at a portion located inside the shield member 18 provided on the upper surface of the light-transmitting substrate 12, a colored transparent layer 12b is provided.

The colored transparent layer 12b provided on the upper surface of the light-transmitting substrate 12 composed of the colorless transparent layer 12a is formed so as to be inside the shield member 18 and in contact with the shield member 18. However, the colored transparent layer 12b may be formed so that the shield member 18 should cover the outer ring of the colored transparent layer 12b.

In the embodiment shown in FIG. 3, the light-transmitting substrate 12 is the colorless transparent layer 12a, and on its upper surface, the colored transparent layer 12b is provided. However, the present invention is not limited to this embodiment, and it is also possible that the light-transmitting substrate 12 is the colored transparent layer 12b and on its upper surface the colorless transparent layer 12a is partially provided by printing using a transparent ink, or it is also possible that the light-transmitting substrate 12 is the colored transparent layer 12b and on its upper surface the colored transparent layer 12b is provided by printing using an ink having a color tone different from that of the ink used for the colored transparent layer 12b of the light-transmitting substrate 12.

The colorless transparent layer 12a or the colored transparent layer 12b may be provided not only at a portion located inside the shield member 18 but also at a portion located outside the shield member 18.

If the light-transmitting substrate 12 is composed of the colorless transparent layer 12a and if the colored transparent layer 12b is formed at a position on the upper surface of the substrate corresponding to the partial print layer 14 that is in sight when the light-transmitting substrate 12 is viewed from above, the partial print layer 14 formed on the back surface of the colorless transparent layer 12a and the colored transparent layer 12b overlap each other, and a novel color tone is brought about.

FIG. 4(a) is a schematic front view of an instrument display board that is another embodiment of the invention, FIG. 4(b) is an essential part enlarged view of FIG. 4(a), and FIG. 4(c) is an essential part enlarged view of FIG. 4(a).

Figure 4:
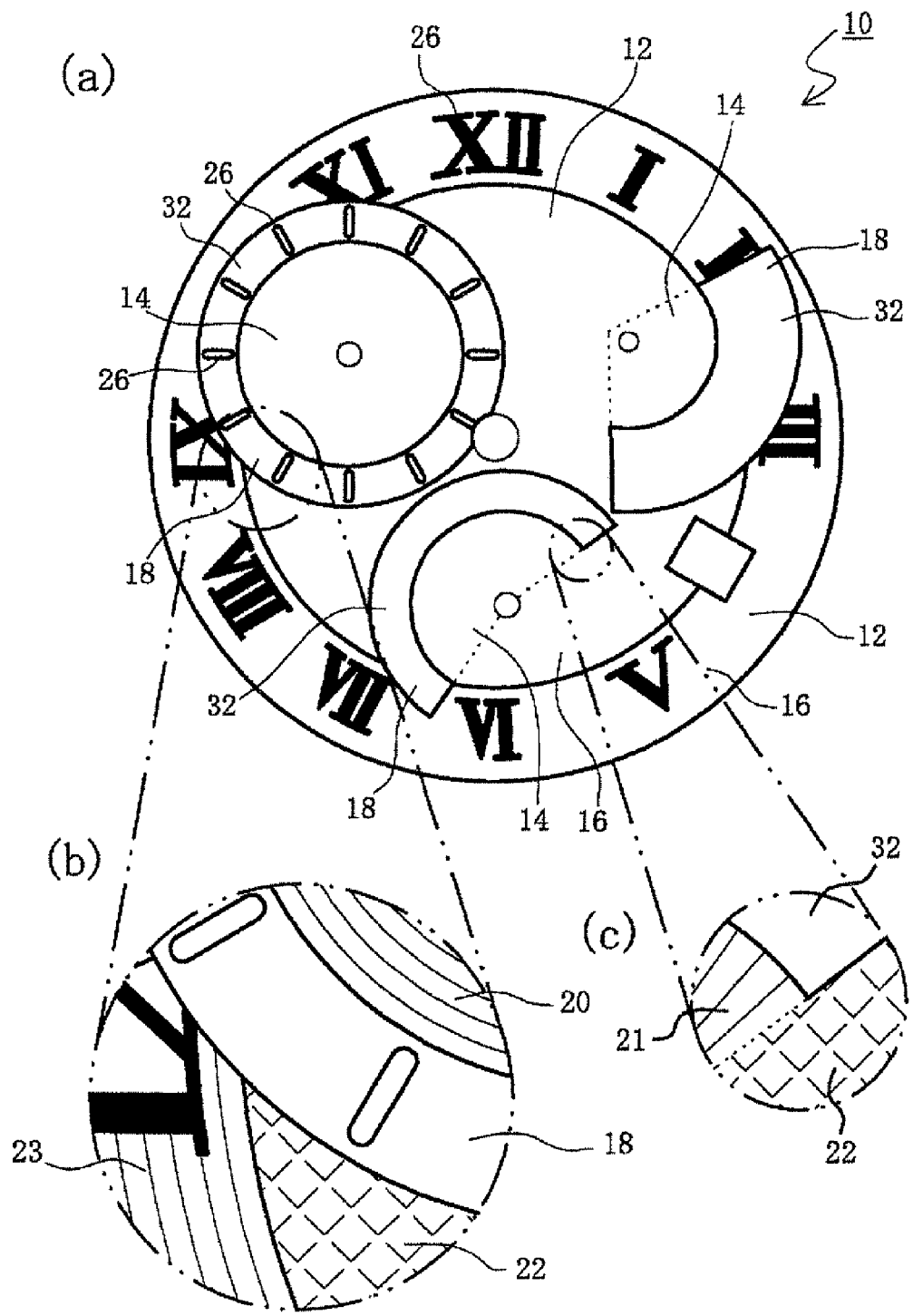
FIG. 4(a) is a schematic front view of an instrument display board that is another embodiment of the present invention.
FIG. 4(b) is an essential part enlarged view of FIG. 4(a)
FIG. 4(c) is an essential part enlarged view of FIG. 4(a).

The instrument display board 10 of FIG. 4 basically has the same constitution as that of the instrument display board 10 of the embodiment shown in FIG. 1, so that like constituent members are given like reference numerals, and their detailed descriptions are omitted.

In the instrument display board 10 of FIG. 4, plural patterns 20, 21, 22 and 23 are provided on the front surface of the light-transmitting substrate 12.

Such patterns 20, 21, 22 and 23 are provided by previously forming patterns on a mold that is used for injection molding to produce the light-transmitting substrate 12 and transferring the patterns onto the front surface of the molded light-transmitting substrate 12 as the patterns 20, 21, 22 and 23.

Figure 5:
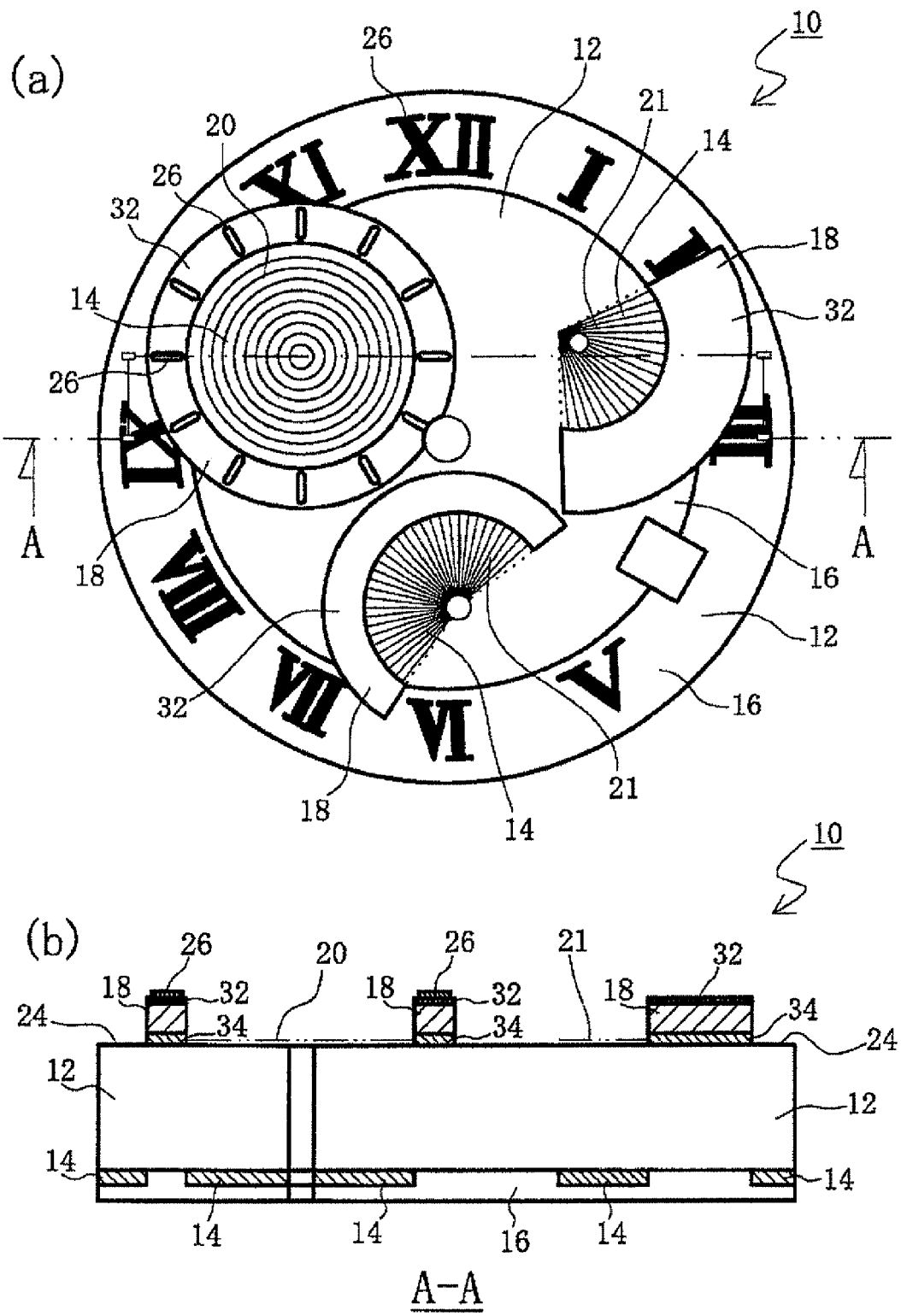
FIG. 5(a) is a schematic front view of an instrument display board that is another embodiment of the present invention.
FIG. 5(b) is a sectional view taken on line A-A of FIG. 5(a).

These patterns are not specifically restricted, and for example, plural kinds of patterns can be provided according to the design of the instrument display board 10, or patterns can be partially provided to form partial patterns, as shown in FIG. 5(a) and FIG. 5(b).

Figure 6:
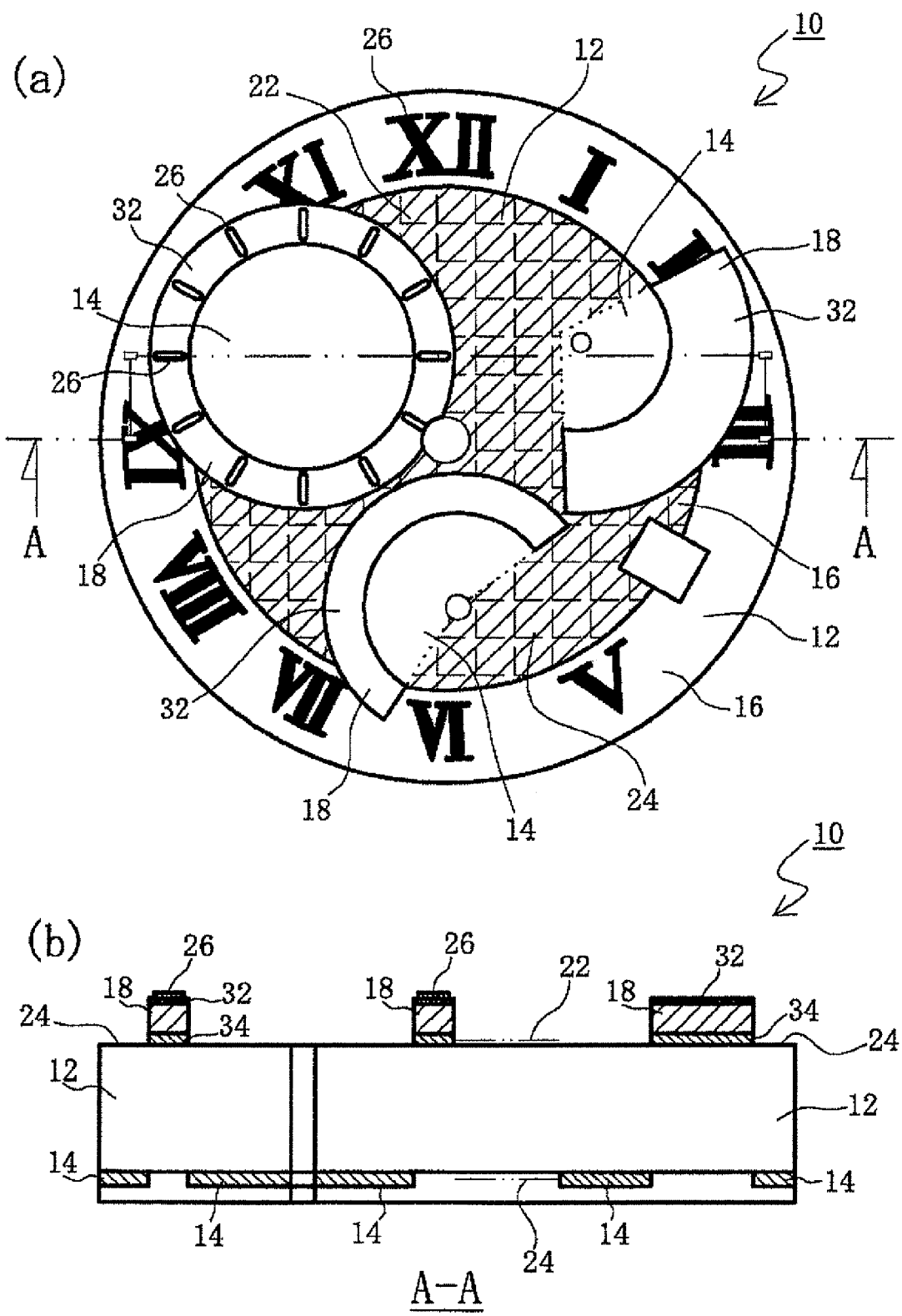
FIG. 6(a) is a schematic front view of an instrument display board that is another embodiment of the present invention.
FIG. 6(b) is a sectional view taken on line A-A of FIG. 6(a).

As shown in FIG. 6(a) and FIG. 6(b), further, the patterns can be provided on both of the front surface and the back surface of the light-transmitting substrate 12.

In this case, the patterns can be provided in such a manner that the pattern 22 on the front surface and the pattern 24 on the back surface overlap each other, or can be provided in such a manner that the pattern 22 on the front surface and the pattern 24 on the back surface do not overlap each other.

As in the embodiment shown in FIG. 4, the patterns can be locally changed, or the patterns may be provided on only the back surface of the light-transmitting substrate 12, and it is preferable to properly select the way to provide the patterns according to the instrument display board 10.

If the patterns are provided on the front surface and the back surface of the light-transmitting substrate 12 as above, a stereoscopic feeling can be effectively presented, unprecedented color tone variation, metallic texture, brilliancy in the light, etc. are brought about, a high-class feeling and design variation become very excellent, and appearance quality becomes excellent, so that merchantability can be enhanced.

FIG. 7(a) is a schematic front view showing another embodiment of the instrument display board 10 of the invention, and FIG. 7(b) is a sectional view taken on line A-A of FIG. 7(a).

Figure 7:
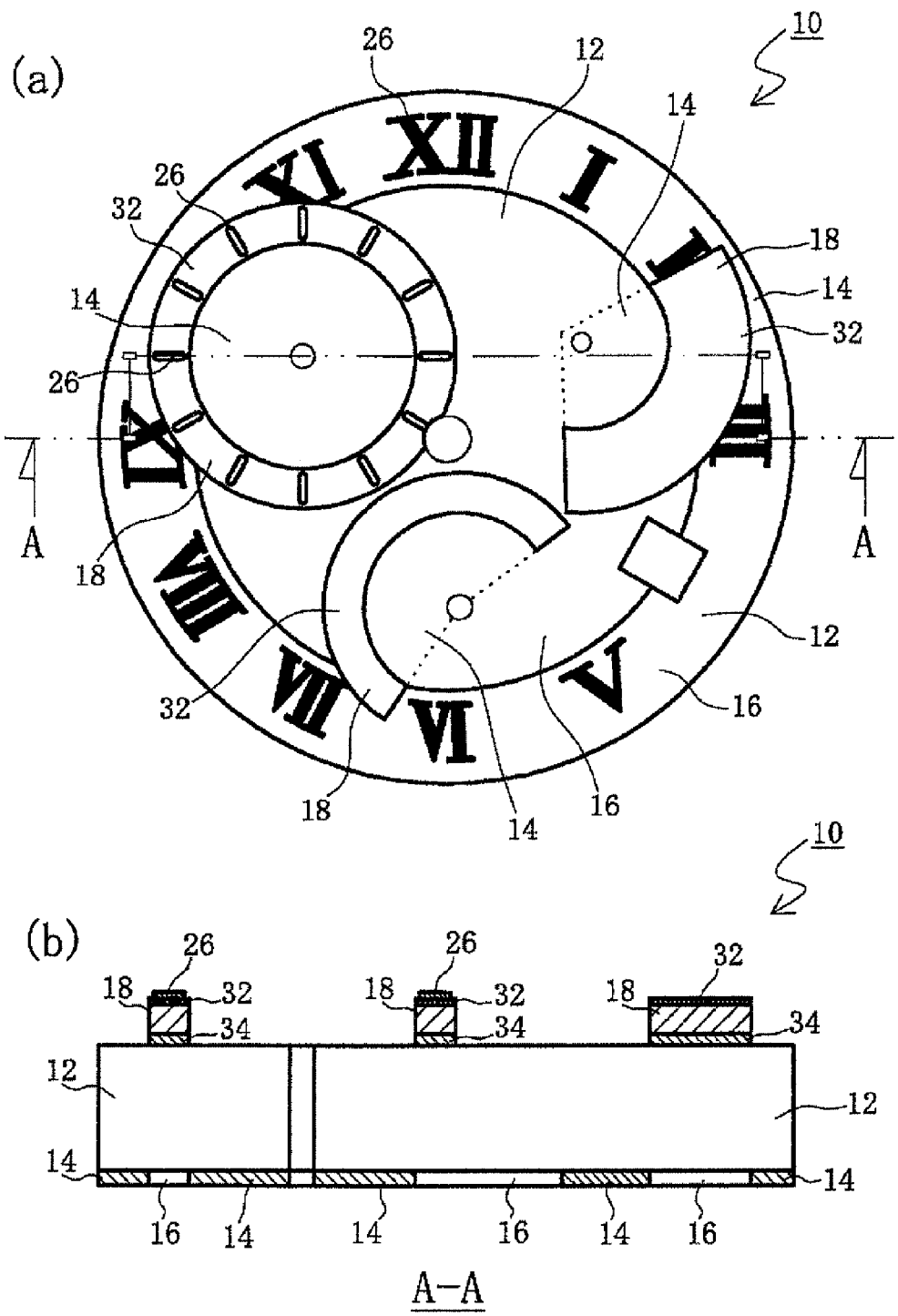
FIG. 7(a) is a schematic front view of an instrument display board that is another embodiment of the present invention.
FIG. 7(b) is a sectional view taken on line A-A of FIG. 7(a).

The instrument display board 10 of FIG. 7 basically has the same constitution as that of the instrument display board 10 of the embodiment shown in FIG. 1, so that like constituent members are given like reference numerals, and their detailed descriptions are omitted.

In FIG. 7, the partial print layer 14 and the different-color print layer 16 are provided on the back surface of the light-transmitting substrate 12 in such a manner that these layers do not overlap each other.

If the partial print layer 14 and the different-color print layer 16 are provided in such a manner that they do not overlap each other as above, the boundary between the partial print layer 14 and the different-color print layer 16 becomes clear, and a stereoscopic feeling can be effectively presented.

Moreover, unprecedented color tone variation, metallic texture, brilliancy in the light, etc. are brought about, a high-class feeling and design variation become very excellent, and appearance quality becomes excellent, so that merchantability can be enhanced.

FIG. 8(a) is a schematic front view showing another embodiment of the instrument display board 10 of the invention, and FIG. 8(b) is a sectional view taken on line A-A of FIG. 8(a).

Figure 8:
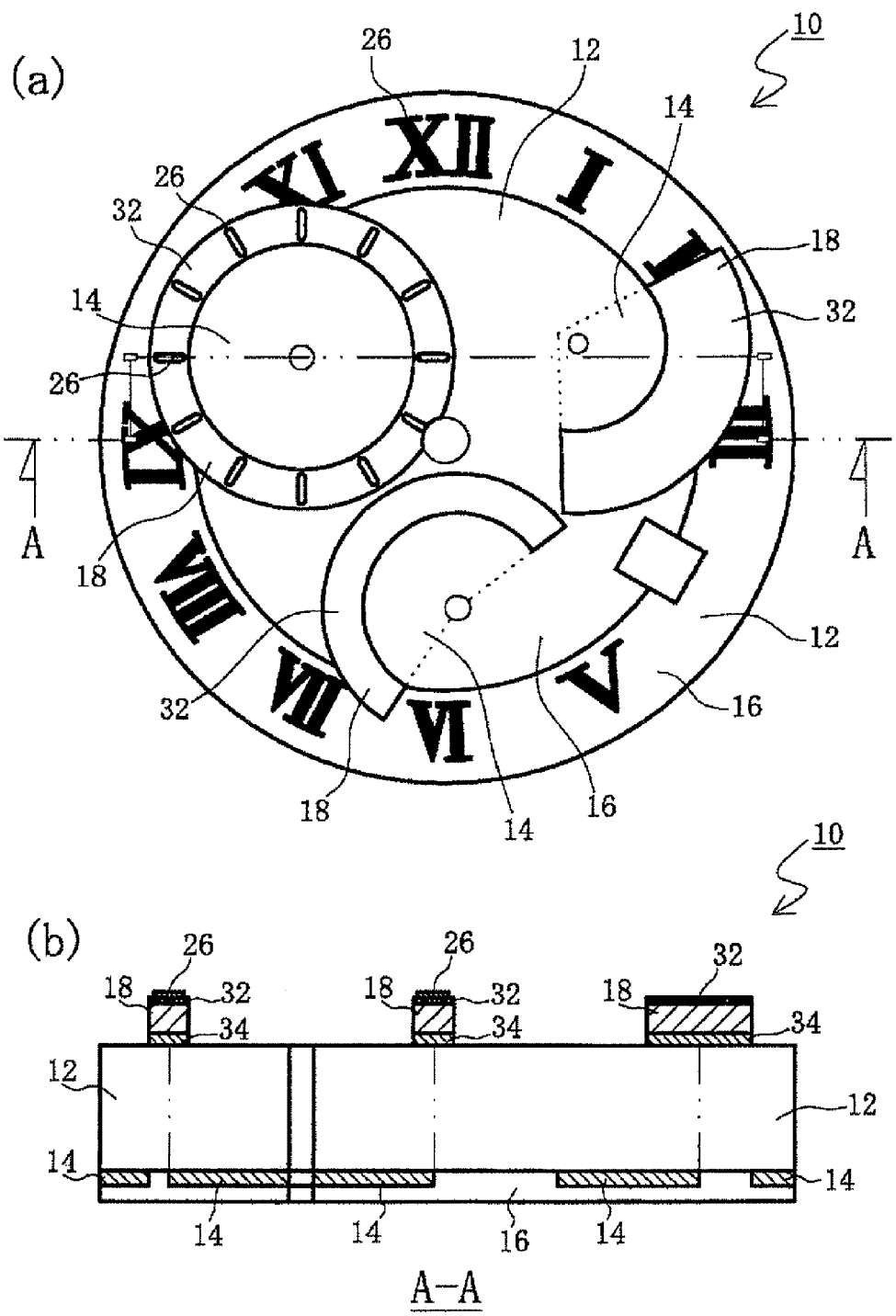
FIG. 8(a) is a schematic front view of an instrument display board that is another embodiment of the present invention.
FIG. 8(b) is a sectional view taken on line A-A of FIG. 8(a).

The instrument display board 10 of FIG. 8 basically has the same constitution as that of the instrument display board 10 of the embodiment shown in FIG. 1, so that like constituent members are given like reference numerals, and their detailed descriptions are omitted.

The instrument display board 10 of FIG. 8 is constituted in such a manner that when the instrument display board 10 is viewed from above, the boundary between the partial print layer 14 and the different-color print layer 16 is not in sight because of the shield member 18.

In the instrument display board 10 thus constituted, the boundary between the partial print layer 14 and the different-color print layer 16 is hidden by the shield member 18 when the instrument display board 10 is viewed from just above or from an oblique direction. Therefore, the boundary portion does not meet the eyes, and the design properties become excellent.

In such an instrument display board 10, the partial print layer 14 and the different-color print layer 16 may be provided in such a manner that they do not overlap each other, as in the instrument display board 10 of the embodiment shown in FIG. 7.

Also in this case, the boundary between the partial print layer 14 and the different-color print layer 16 is hidden by the shield member 18 when the instrument display board 10 is viewed from just above or from an oblique direction. Therefore, the boundary portion does not meet the eyes, and the design properties become excellent.

FIG. 9(a) is a schematic front view showing another embodiment of the instrument display board 10 of the invention, and FIG. 9(b) is a sectional view taken on line A-A of FIG. 9(a).

Figure 9:
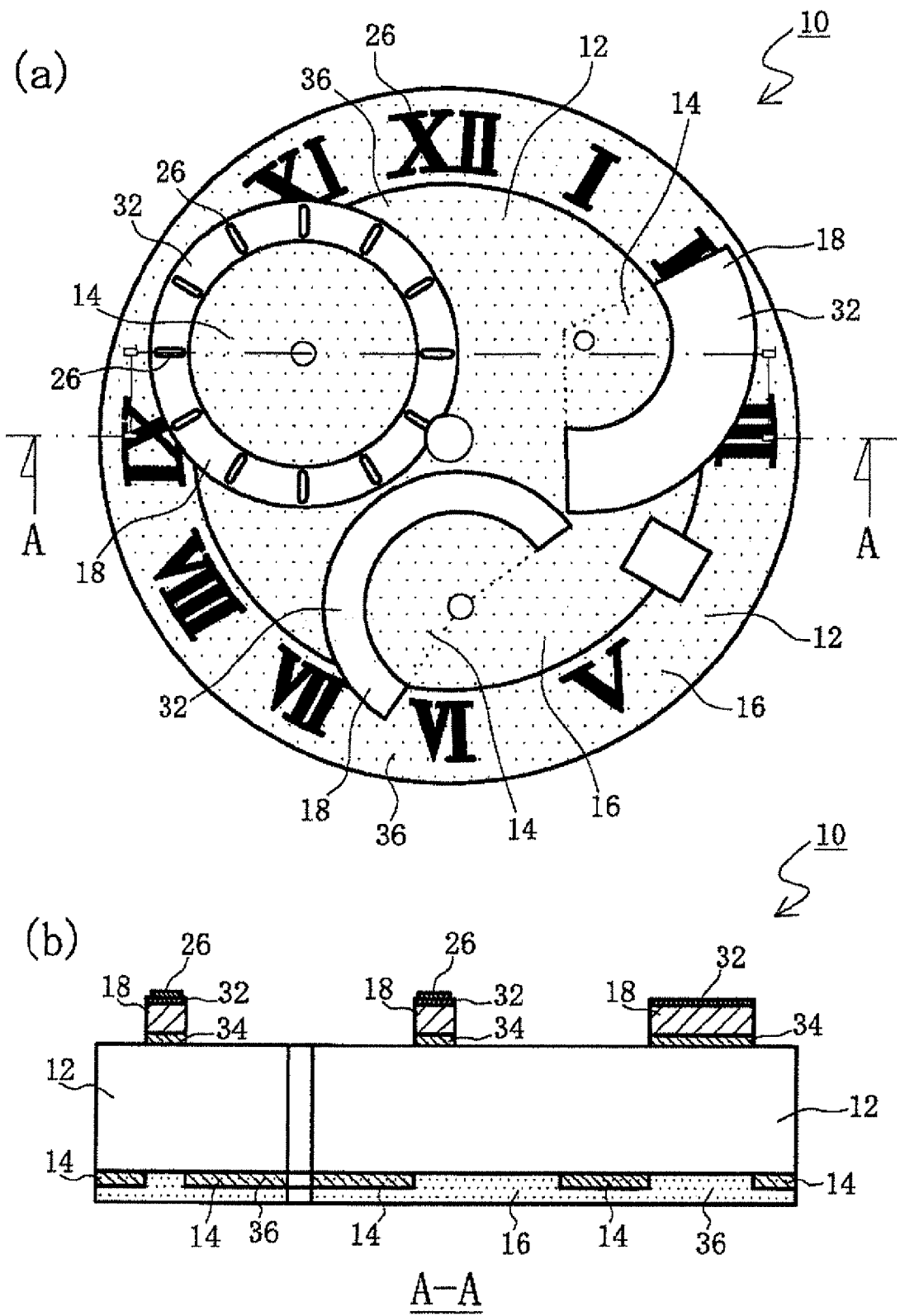
FIG. 9(a) is a schematic front view of an instrument display board that is another embodiment of the present invention.
FIG. 9(b) is a sectional view taken on line A-A of FIG. 9(a).

The instrument display board 10 of FIG. 9 basically has the same constitution as that of the instrument display board 10 of the embodiment shown in FIG. 1, so that like constituent members are given like reference numerals, and their detailed descriptions are omitted.

In the instrument display board 10 of FIG. 9, a light-reflecting powder 36, which reflects light to produce a luster when light strikes it, is dispersed in the partial print layer 14 and the different-color print layer 16.

The light-reflecting powder 36 is preferably a light-reflecting powder 36 in which the surface of mica that is a core of the light-reflecting powder 36 is coated with a metal or a metal oxide.

Such mica is not specifically restricted, but for example, hard mica (Muscovite, $KAl_2(Si_3Al)O_{10}(OH_2)$) that is transparent or assumes a light yellow color, or soft mica (Phlogopite, $KMg(Si_3Al)O_{10}(OH)_2$) that assumes a brown color or a dark green color can be employed.

In this case, as the metal used for coating the surface of mica, one metal selected from nickel, aluminum, gold, silver, copper and palladium, or an alloy of two or more metals selected from these metals can be employed.

For example, Au—Ag, Au—Cu, Au—Ni, Ag—Pd, Au—Al, Cu—Al, Au—Cr, Au—Co, Au—In and Pd—Ni are employable as binary alloys, and Au—Cu—Pd, Au—Ag—Cu and Au—In—Co are employable as ternary alloys.

By using the binary alloy or the ternary alloy as above, various metallic colors that are never given by single metals can be obtained, and hence, design variation is widened.

For example, the Au—Ag alloy brings about a yellow gold color, and the Au—Cu alloy brings about a red gold color.

As the metal oxide used for coating the surface of mica, at least one metal oxide selected from titanium oxide, iron oxide, tin oxide, silicon oxide, aluminum oxide and zirconium oxide can be employed.

In the light-reflecting powder 36 having a luster that is contained in the partial print layer 14 and the different-color print layer 16, the mica is preferably contained in an amount of 40 to 80% by weight, and the metal or the metal oxide is preferably contained in an amount of 20 to 60% by weight.

When the mica and the metal or the metal oxide are contained in such proportions, a color tone and a luster of the mica and a metallic color of the metal or the metal oxide overlap each other, whereby a luster including not only a pearly luster but also a metallic luster can be imparted to the partial print layer 14 and the different-color print layer 16.

Further, the light-reflecting powder 36 having a luster that is contained in the partial print layer 14 and the different-color print layer 16 is preferably a light-reflecting powder 36 in which the surfaces of flakes of aluminum oxide or silicon oxide are coated with a metal or a metal oxide.

In this case, the metal used for coating the surfaces of the flakes can comprise one metal selected from nickel, aluminum, gold, silver, copper and palladium, or an alloy of two or more metals selected from these metals.

For example, Au—Ag, Au—Cu, Au—Ni, Ag—Pd, Au—Al, Cu—Al, Au—Cr, Au—Co, Au—In and Pd—Ni are employable as binary alloys, and Au—Cu—Pd, Au—Ag—Cu and Au—In—Co are employable as ternary alloys.

By using the binary alloy or the ternary alloy as above, various metallic colors that are never given by single metals can be obtained, and hence, design variation is widened.

For example, the Au—Ag alloy brings about a yellow gold color, and the Au—Cu alloy brings about a red gold color.

The metal oxide used for coating the surfaces of the flakes can comprise at least one metal oxide selected from titanium oxide, iron oxide, tin oxide, silicon oxide, aluminum oxide and zirconium oxide.

In this case, by using $Al_2O_3$ and a metal oxide of $Fe_2O_3$ and by changing the thickness of the metal oxide, the color tone can be freely changed from a copper color to red.

Further, by using flakes of $Al_2O_3$ and metal oxides of $SnO_2$ and $TiO_2$ in a two-layer structure and by changing the thickness of each metal oxide, the color tone can be freely changed from silver, gold, red, blue to green.

By using flakes of $SiO_2$ and a metal oxide of $Fe_2O_3$, a color tone that varies from red to green depending upon the viewer's viewing angle can be obtained.

By using flakes of $SiO_2$ and metal oxides of $SnO_2$ and $TiO_2$ in a two-layer structure, a color tone that varies from purple to green depending upon the viewer's viewing angle can be obtained.

In the light-reflecting powder 36 having a luster that is contained in the partial print layer 14 and the different-color print layer 16, the flakes are preferably contained in an amount of 40 to 80% by weight, and the metal or the metal oxide is preferably contained in an amount of 20 to 60% by weight.

When the flakes and the metal or the metal oxide are contained in such proportions, a color tone and a luster of the flakes and a metallic color of the metal or the metal oxide overlap each other, whereby a luster including not only a pearly luster but also a metallic luster can be imparted to the partial print layer 14 and the different-color print layer 16.

In the present invention, the particle diameter of the light-reflecting powder 36 having a luster is desirably in the range of 5 to 50 μm.

That is to say, if the particle diameter of the light-reflecting powder 36 having a luster is in the above range, the light-reflecting powder 36 having a luster shines brilliantly when light is incident upon the partial print layer 14 and the different-color print layer 16, and hence, the partial print layer 14 and the different-color print layer 16 bring about a luster with brilliancy.

In the partial print layer 14 and the different-color print layer 16, the light-reflecting powder 36 having a luster is desirably contained in an amount of 0.5 to 5% by weight based on the base material of the partial print layer 14 or the different-color print layer 16.

If the content of the light-reflecting powder 36 having a pearly luster is in the above range, the light-reflecting powder 36 having a luster shines brilliantly when light is incident upon the partial print layer 14 and the different-color print layer 16, and hence, the partial print layer 14 and the different-color print layer 16 bring about a luster with brilliancy.

The light-reflecting powder 36 may be contained in the partial print layer 14 only, or may be contained in the different-color print layer 16 only.

It is preferable to properly use the light-reflecting powder 36 according to the design or the like. For example, the light-reflecting powder 36 is used in only a portion of the partial print layer 14 or a portion of the different-color print layer 16 corresponding to the outer periphery of the instrument display board 10.

Such a light-reflecting powder 36 may be contained in the light-transmitting substrate 12.

Such a light-transmitting substrate 12 can be produced by subjecting synthetic resin pellets for forming the base material and the light-reflecting powder 36 having a luster to injection molding.

FIG. 10(a) is a schematic front view of an instrument display board that is another embodiment of the invention, and FIG. 10(b) is an essential part enlarged view of FIG. 10(a).

Figure 10:
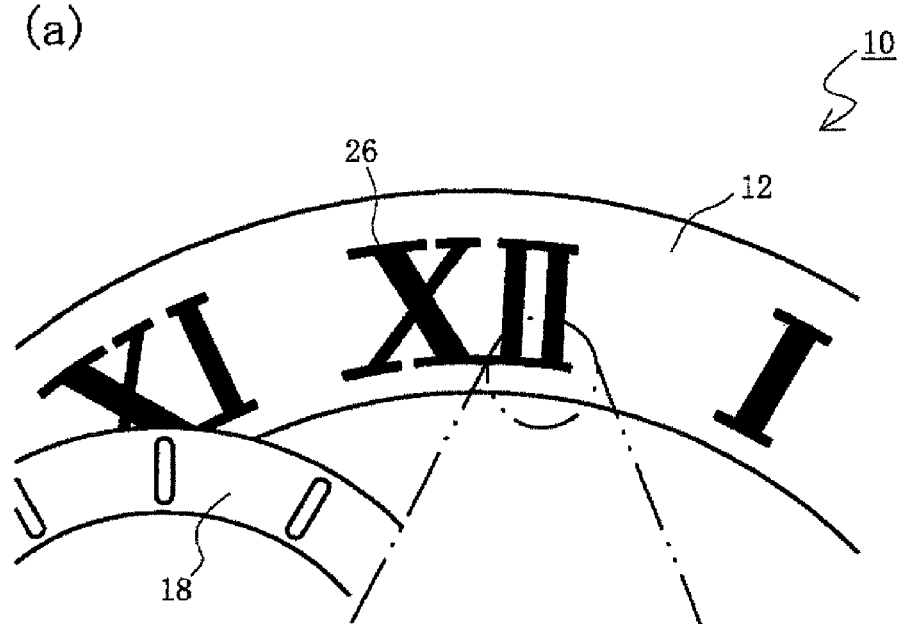
FIG. 10(a) is an essential part enlarged front view of an instrument display board that is another embodiment of the present invention.
FIG. 10(b) is an essential part enlarged view of FIG. 10(a).
Figure 10:
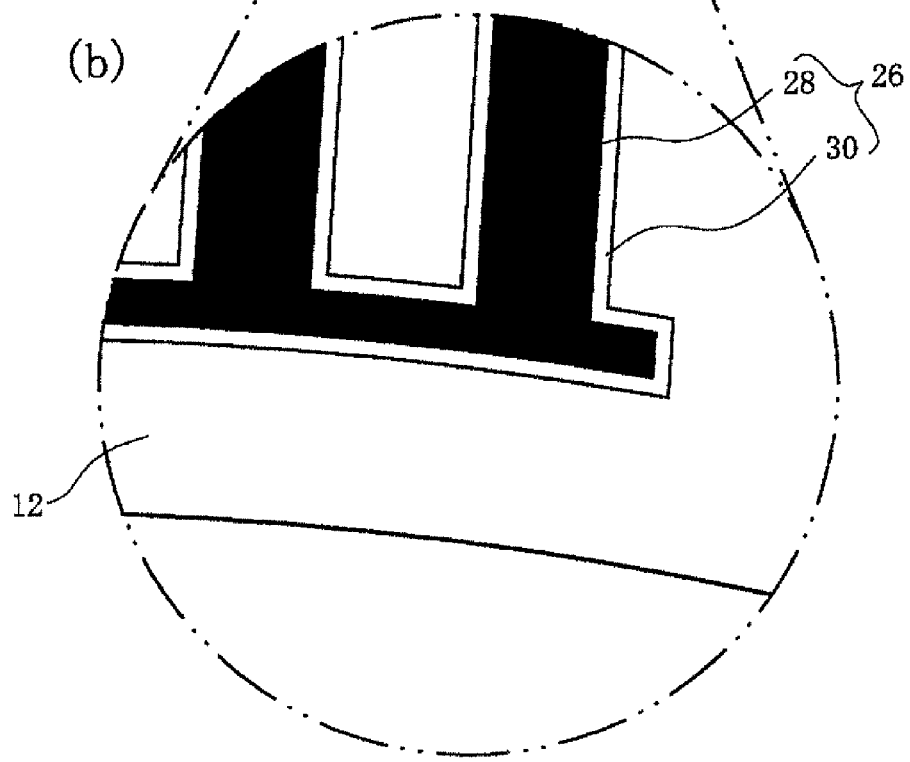

The instrument display board 10 of FIG. 10 basically has the same constitution as that of the instrument display board 10 of the embodiment shown in FIG. 1, so that like constituent members are given like reference numerals, and their detailed descriptions are omitted.

The display print layer 26 provided on the front surface of the light-transmitting substrate 12 of the instrument display board 10 shown in FIG. 10(a) is a layer printed with an ink 28 and an ink 30 which are different in color tones, as shown in FIG. 10(b).

For such a display print layer 26, printing is made so that the ink 28 that is a main ink should be framed with the ink 30 having a different color tone, whereby the color of the ink 28 that is a main ink is clearly displayed, and besides, a stereoscopic feeling and a high-class feeling can be effectively presented.

Moreover, unprecedented color tone variation, metallic texture, brilliancy in the light, etc. are brought about, a high-class feeling and design variation become very excellent, and appearance quality becomes excellent, so that merchantability can be enhanced.

Figure 11:
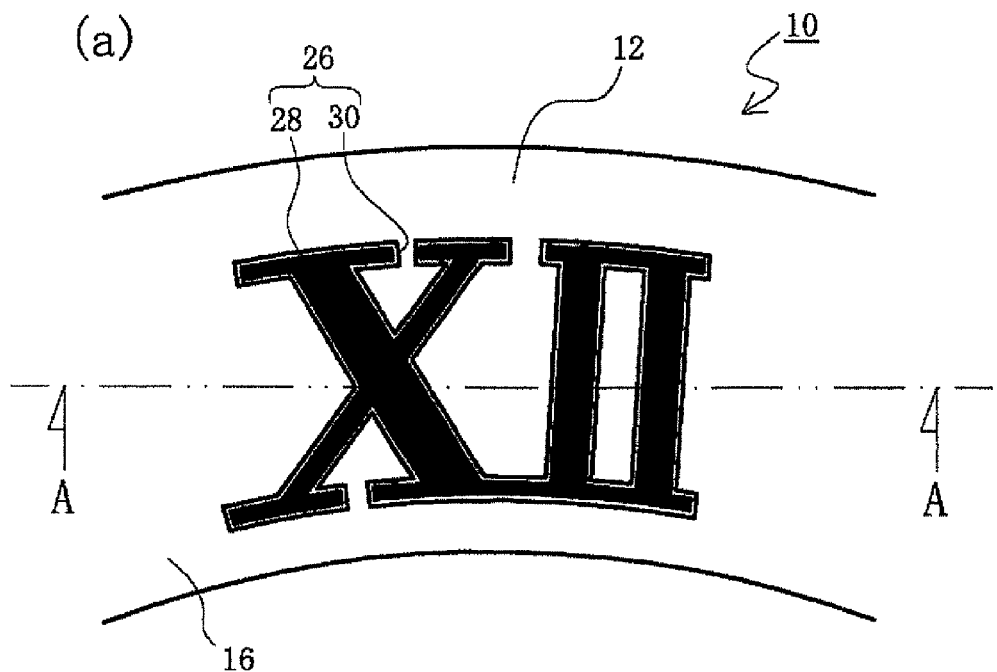
FIG. 11(a) is an essential part enlarged front view of an instrument display board that is another embodiment of the present invention.
FIG. 11(b) is a sectional view taken on line A-A of FIG. 11(a).
Figure 11:
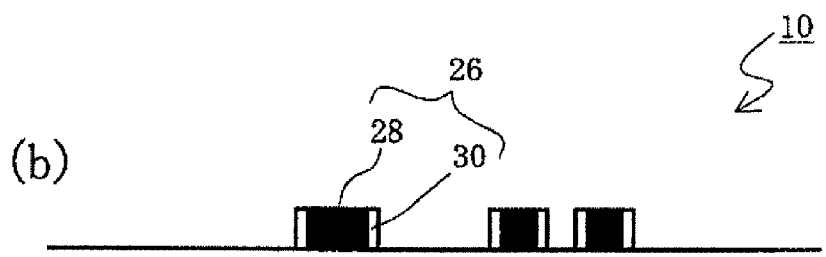

For the display print layer 26 shown in FIG. 11(a) and FIG. 11(b), printing is made so that the ink 30 should be in contact with the ink 28 that is a main ink.

Figure 12:
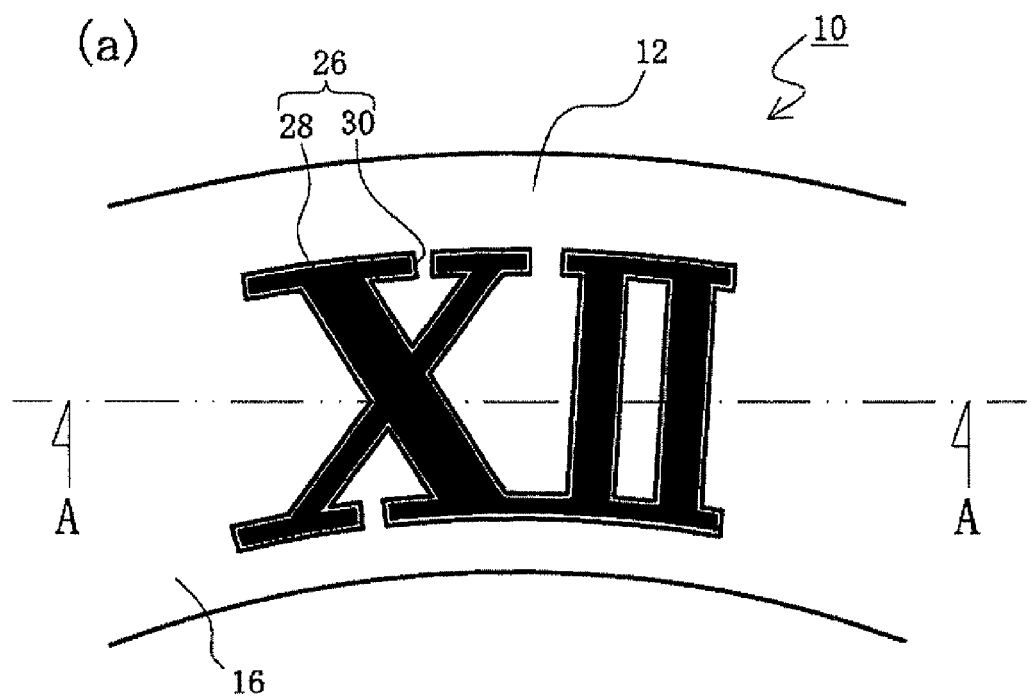
FIG. 12(a) is an essential part enlarged front view of an instrument display board that is another embodiment of the present invention.
FIG. 12(b) is a sectional view taken on line A-A of FIG. 12(a).
Figure 12:
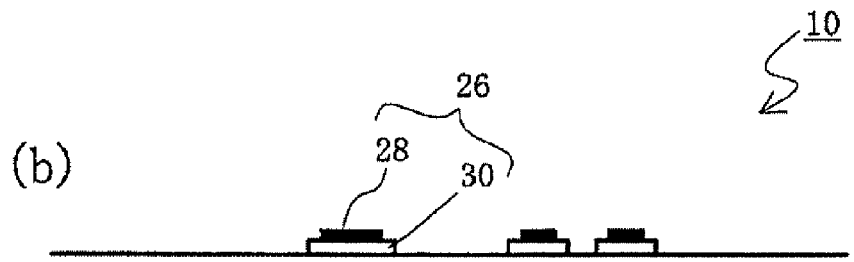
Figure 13:
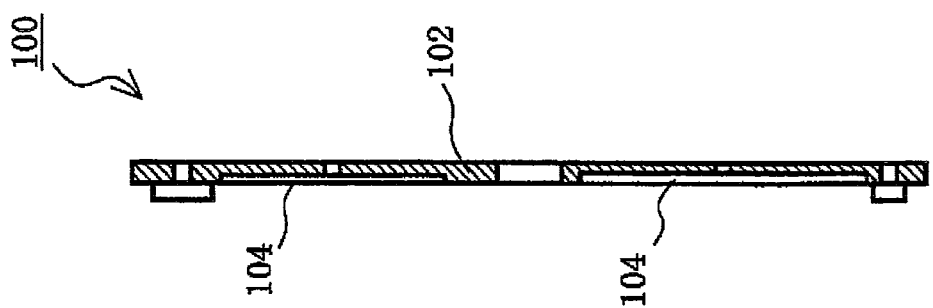
FIG. 13 is a group of a front view and a sectional view of a conventional time keeping instrument dial.
Figure 13:
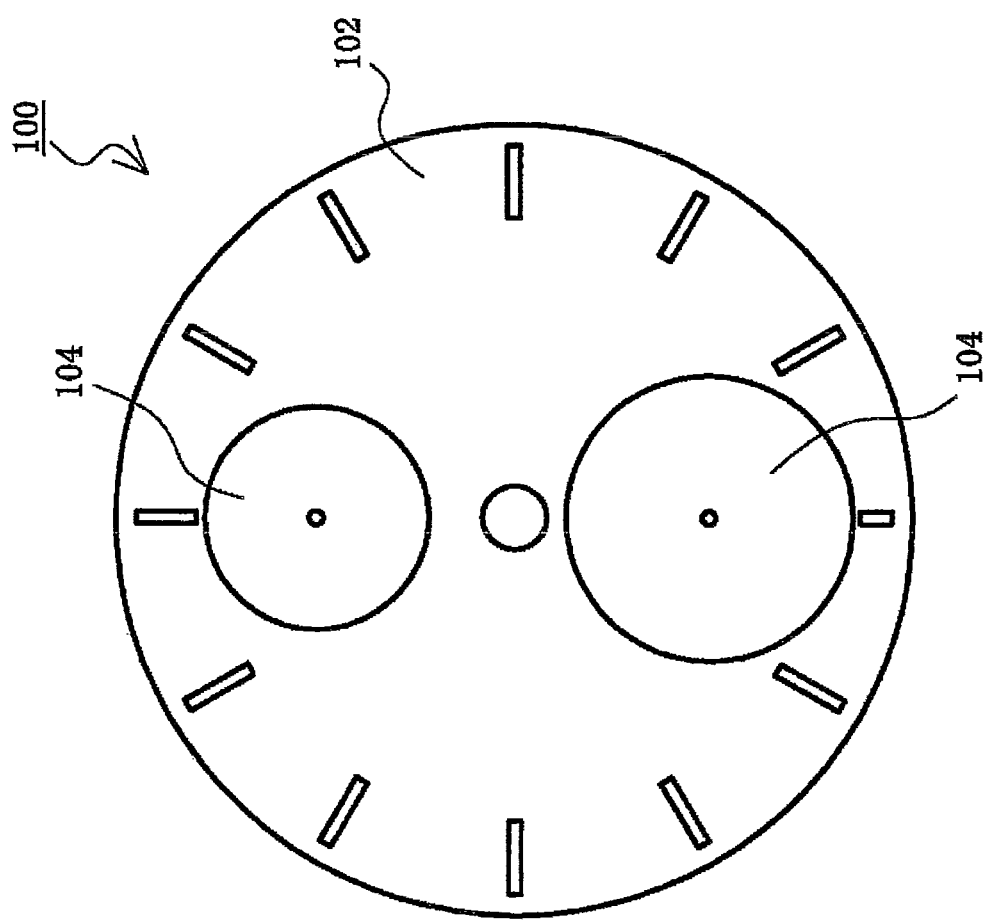
Figure 14:
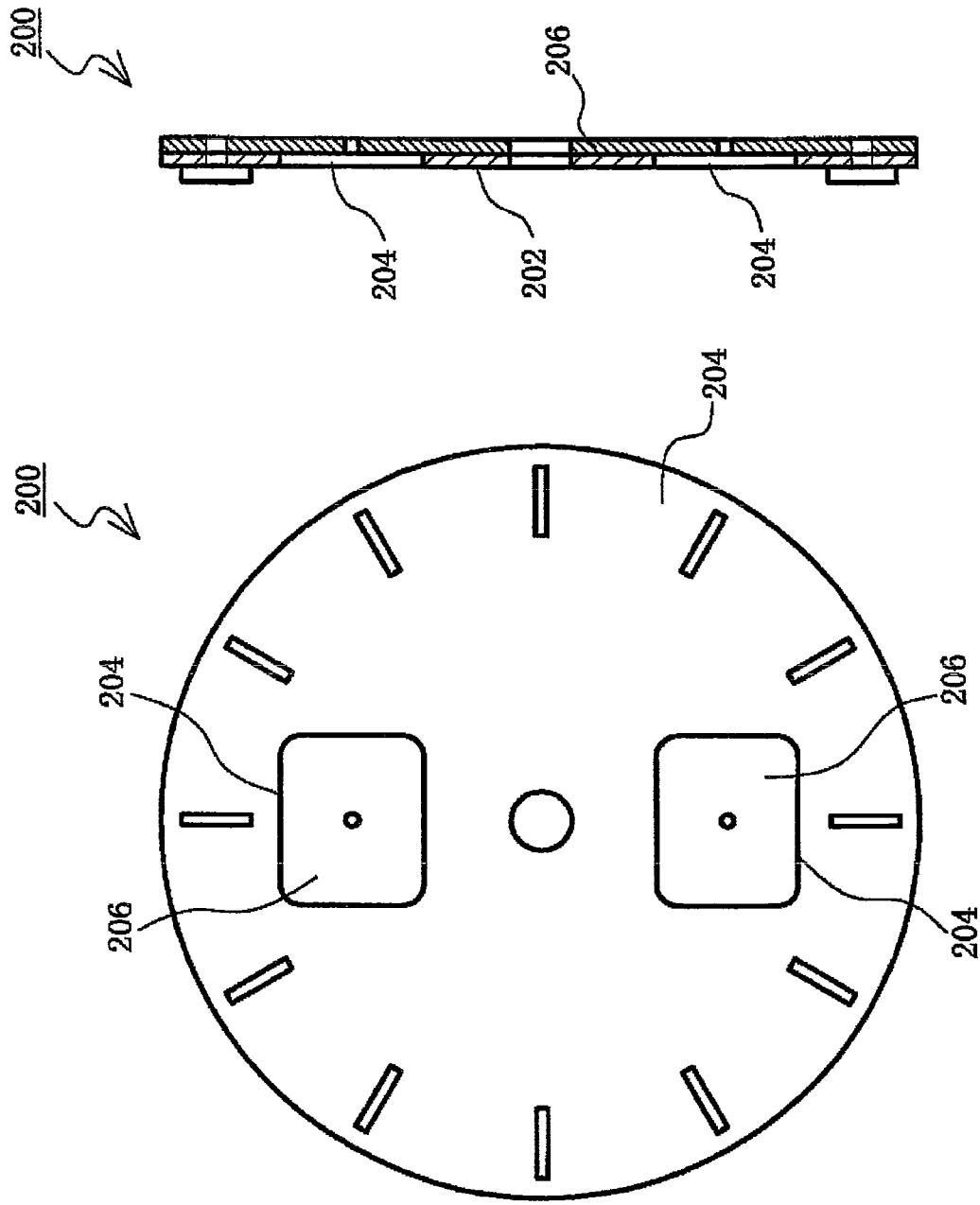
FIG. 14 is a group of a front view and a sectional view of a conventional time keeping instrument dial.

For the display print layer 26 shown in FIG. 12(a) and FIG. 12(b), the ink 30 (large line width) is previously printed on the front surface of the light-transmitting substrate 12, and thereon the ink 28 (small line width) that is a main ink is printed.

If the ink 28 and the ink 30 are partially superposed one upon another, the display print layer 26 could be seen as if it has shades, whereby a stereoscopic feeling and a high-class feeling can be effectively presented.

Although some embodiments of the instrument display board of the present invention are described hereinbefore, the present invention is in no way limited to these embodiments, and the present invention can be carried out also by combining these embodiments, and various modifications can be made without departing from the object of the present invention.

EXAMPLE 1

Using a polycarbonate resin as a resin of a base material, injection molding was carried out to obtain a light-transmitting substrate 12 having a thickness of 500 μm.

In the polycarbonate resin used for the light-transmitting substrate 12, a light-reflecting powder 36 having a particle diameter of 5 μm to 50 μm was contained, and the surface of mica ($Al_2O_3$) was coated with $TiO_2$ and $Fe_2O_3$ in layers to make the color tone gold (metallic color tone).

On a cavity side (corresponding to the front surface of the light-transmitting substrate 12) of a mold used for the injection molding, a sunburst pattern was previously formed at a portion corresponding to a partial print layer 14, and at other portions, a pattern of Piaget cut that was different from the pattern of the portion corresponding to the partial print layer 14 was previously formed. Consequently, on the front surface of the light-transmitting substrate 12 produced by the use of this mold, the above patterns were provided.

On the back surface of the light-transmitting substrate 12, a partial print layer 14 having a thickness of 5 μm to 15 μm was printed by screen printing with an ink comprising an acrylic resin containing a pigment of a color of blue (color tone No. 18), and thereon, a different-color print layer 16 having a thickness of 5 μm to 15 μm was further printed by screen printing with an ink comprising an acrylic resin containing a pigment of a color of yellowish orange (color tone No. 6).

On the front surface of the light-transmitting substrate 12, a shield member 18 having a thickness of 30 μm was provided by an electrodeposition method (electroforming method) at a portion corresponding to the partial print layer 14 provided on the back surface of the light-transmitting substrate 12.

On the upper surface of the shield member 18, a layer of rhodium plating having a thickness of 0.5 μm was formed as a decorative film 32, and thereon, a display print layer 26 was further printed by pad printing.

On the front surface of the light-transmitting substrate 12, a display print layer 26 (division, manufacturer's name, etc.) was printed by pad printing, whereby an instrument display board 10 was prepared.

The instrument display board 10 thus obtained could present a stereoscopic feeling and a high-class feeling, brought about unprecedented color tone variation, metallic texture, brilliancy in the light, etc., was very excellent in high-class feeling and design variation, had excellent appearance quality and therefore could enhance merchantability.

The appearance of mica varied depending upon the color tone of the base of the instrument display board 10, so that evaluation was carried out by viewing the instrument display board 10 only.

The instrument display board 10 was used as a solar cell time keeping instrument display board. As a result, the instrument display board 10 had a light transmittance of 20 to 40% contributing to power generation of a solar cell, and did not inhibit the function of the solar cell time keeping instrument itself.

EXAMPLE 2

Using a polycarbonate resin as a resin of a base material, injection molding was carried out to obtain a colorless transparent light-transmitting substrate 12 having a thickness of 400 μm.

On a cavity side (corresponding to the front surface of the light-transmitting substrate 12) and a core side (corresponding to the back surface of the light-transmitting substrate 12) of a mold used for the injection molding, a sunburst pattern was previously formed at a portion corresponding to a partial print layer 14, and at other portions, a pattern of Piaget cut that was different from the pattern of the portion corresponding to the partial print layer 14 was previously formed. Consequently, on the front and the back surfaces of the light-transmitting substrate 12 produced by the use of this mold, the above patterns were provided.

On the back surface of the light-transmitting substrate 12, a partial print layer 14 having a thickness of 5 μm to 15 μm was printed by screen printing with an ink comprising a urethane resin containing a pigment of a color of blue (color tone No. 18), and thereon, a different-color print layer 16 having a thickness of 5 μm to 15 μm was further printed by screen printing with an ink comprising a urethane resin containing a pigment of a color of yellowish orange (color tone No. 6).

On the front surface of the light-transmitting substrate 12, a shield member 18 having a thickness of 30 μm was provided by an electrodeposition method (electroforming method) at a portion corresponding to the partial print layer 14 provided on the back surface of the light-transmitting substrate 12.

On the upper surface of the shield member 18, a layer of gold plating having a thickness of 0.5 μm was formed as a decorative film 32, and thereon, a display print layer 26 was further printed by pad printing.

On the front surface of the light-transmitting substrate 12, a display print layer 26 was printed by pad printing, whereby an instrument display board 10 was prepared.

The instrument display board 10 thus obtained could present a stereoscopic feeling and a high-class feeling, brought about unprecedented color tone variation, metallic texture, brilliancy in the light, etc., was very excellent in high-class feeling and design variation, had excellent appearance quality and therefore could enhance merchantability.

The instrument display board 10 was used as a solar cell time keeping instrument display board. As a result, the instrument display board 10 had a light transmittance of 20 to 40% contributing to power generation of a solar cell, and did not inhibit the function of the solar cell time keeping instrument itself.

EXAMPLE 3

Using a polycarbonate resin as a resin of a base material, injection molding was carried out to obtain a colorless transparent light-transmitting substrate 12 having a thickness of 300 μm.

On a cavity side (corresponding to the front surface of the light-transmitting substrate 12) of a mold used for the injection molding, a sunburst pattern was previously formed at a portion corresponding to a partial print layer 14, and at other portions, a pattern of Piaget cut that was different from the pattern of the portion corresponding to the partial print layer 14 was previously formed. Consequently, on the front surface of the light-transmitting substrate 12 produced by the use of this mold, the above patterns were provided.

On the back surface of the light-transmitting substrate 12, a partial print layer 14 having a thickness of 5 μm to 15 μm was printed by screen printing with an ink comprising an acrylic resin containing a pigment of a color of yellowish orange (color tone No. 6), and thereon, a different-color print layer 16 (metallic color tone) having a thickness of 5 μm to 15 μm was further printed by screen printing with an ink comprising an acrylic resin containing, as a light-reflecting powder 36, a pigment which had a particle diameter of 5 μm to 50 μm and in which the surface of mica ($Al_2O_3$) was coated with a layer of $TiO_2$ to make the color tone of the pigment greenish blue (color tone No. 17).

On the front surface of the light-transmitting substrate 12, a shield member 18 having a thickness of 30 μm was provided by an electrodeposition method (electroforming method) at a portion corresponding to the partial print layer 14 provided on the back surface of the light-transmitting substrate 12.

On the upper surface of the shield member 18, a layer of gold plating having a thickness of 0.5 μm was formed as a decorative film 32, and thereon, a display print layer 26 was further printed by pad printing.

On the front surface of the light-transmitting substrate 12, a display print layer 26 was printed by pad printing, whereby an instrument display board 10 was prepared.

The instrument display board 10 thus obtained could present a stereoscopic feeling and a high-class feeling, brought about unprecedented color tone variation, metallic texture, brilliancy in the light, etc., was very excellent in high-class feeling and design variation, had excellent appearance quality and therefore could enhance merchantability.

The appearance of mica varied depending upon the color tone of the base of the instrument display board 10, so that evaluation was carried out by viewing the instrument display board 10 only.

The instrument display board 10 was used as a solar cell time keeping instrument display board. As a result, the instrument display board 10 had a light transmittance of 20 to 40% contributing to power generation of a solar cell, and did not inhibit the function of the solar cell time keeping instrument itself.

EXAMPLE 4

Using a polycarbonate resin as a resin of a base material, injection molding was carried out to obtain a colorless transparent light-transmitting substrate 12 having a thickness of 600 μm.

On a cavity side (corresponding to the front surface of the light-transmitting substrate 12) of a mold used for the injection molding, a sunburst pattern was previously formed at a portion corresponding to a partial print layer 14, and at other portions, a pattern of Piaget cut that was different from the pattern of the portion corresponding to the partial print layer 14 was previously formed. Consequently, on the front surface of the light-transmitting substrate 12 produced by the use of this mold, the above patterns were provided.

On the back surface of the light-transmitting substrate 12, a partial print layer 14 composed of a urethane resin containing a pigment of a color of yellowish orange (color tone No. 6) and having a thickness of 5 μm to 15 μm was printed by screen printing, and thereon, a different-color print layer 16 composed of a urethane resin containing a pigment of a color of greenish blue (color tone No. 17) and having a thickness of 5 μm to 15 μm was further printed by screen printing.

On the front surface of the light-transmitting substrate 12, a shield member 18 having a thickness of 20 μm was printed by screen printing at a portion corresponding to the partial print layer 14 provided on the back surface of the light-transmitting substrate 12.

On the shield member 18, an ink of a gold color was provided, and thereon, a display print layer 26 was further printed by pad printing.

On the front surface of the light-transmitting substrate 12, a display print layer 26 was printed by pad printing, whereby an instrument display board 10 was prepared.

The instrument display board 10 thus obtained could present a stereoscopic feeling and a high-class feeling, brought about unprecedented color tone variation, metallic texture, brilliancy in the light, etc., was very excellent in high-class feeling and design variation, had excellent appearance quality and therefore could enhance merchantability.

The instrument display board 10 was used as a solar cell time keeping instrument display board. As a result, the instrument display board 10 had a light transmittance of 15 to 40% contributing to power generation of a solar cell, and did not inhibit the function of the solar cell time keeping instrument itself.

EXAMPLE 5

Using a polycarbonate resin as a resin of a base material, injection molding was carried out to obtain a colorless transparent light-transmitting substrate 12 having a thickness of 500 μm.

On the back surface of the light-transmitting substrate 12, a partial print layer 14 composed of an alkyd resin containing a pigment of a color of yellowish orange (color tone No. 6) and having a thickness of 5 μm to 15 μm was printed by screen printing, and thereon, a different-color print layer 16 composed of an alkyd resin containing a pigment of a color of bluish green (color tone No. 13) and having a thickness of 5 μm to 15 μm was further printed by screen printing.

On the front surface of the light-transmitting substrate 12, a shield member 18 having a thickness of 25 μm was printed by screen printing at a portion corresponding to the partial print layer 14 provided on the back surface of the light-transmitting substrate 12.

On the shield member 18, an ink of a black color was provided, and thereon, a display print layer 26 was further printed by pad printing.

On the front surface of the light-transmitting substrate 12, a display print layer 26 was printed by pad printing, whereby an instrument display board 10 was prepared.

The instrument display board 10 thus obtained could present a stereoscopic feeling and a high-class feeling, brought about unprecedented color tone variation, metallic texture, brilliancy in the light, etc., was very excellent in high-class feeling and design variation, had excellent appearance quality and therefore could enhance merchantability.

The instrument display board 10 was used as a solar cell time keeping instrument display board. As a result, the instrument display board 10 had a light transmittance of 15 to 40% contributing to power generation of a solar cell, and did not inhibit the function of the solar cell time keeping instrument itself.

EXAMPLE 6

Using an acrylic resin as a resin of a base material, injection molding was carried out to obtain a colorless transparent light-transmitting substrate 12 having a thickness of 400 μm.

On a cavity side (corresponding to the front surface of the light-transmitting substrate 12) of a mold used for the injection molding, a sunburst pattern was previously formed at a portion corresponding to a partial print layer 14, and at other portions, a pattern of Piaget cut that was different from the pattern of the portion corresponding to the partial print layer 14 was previously formed. Consequently, on the front surface of the light-transmitting substrate 12 produced by the use of this mold, the above patterns were provided.

On the back surface of the light-transmitting substrate 12, a partial print layer 14 (metallic color tone) composed of an acrylic resin containing a pigment in which the surface of mica ($Al_2O_3$) was coated with $SnO_2$ and $TiO_2$ in layers to make the color tone of the pigment silver, and having a thickness of 5 μm to 15 μm was printed by screen printing, and thereon, a different-color print layer 16 composed of an acrylic resin containing a pigment of a color of blue (color tone No. 18) and having a thickness of 5 μm to 15 μm was further printed by screen printing.

On the front surface of the light-transmitting substrate 12, a shield member 18 produced by etching of a metal plate and having a thickness of 30 μm was provided through an adhesive at a portion corresponding to the partial print layer 14 provided on the back surface of the light-transmitting substrate 12.

On the upper surface of the shield member 18, a layer of rhodium plating having a thickness of 0.8 μm was formed as a decorative film 32, and thereon, a display print layer 26 was further printed by pad printing.

On the front surface of the light-transmitting substrate 12, a display print layer 26 was printed by pad printing, whereby an instrument display board 10 was prepared.

The instrument display board 10 thus obtained could present a stereoscopic feeling and a high-class feeling, brought about unprecedented color tone variation, metallic texture, brilliancy in the light, etc., was very excellent in high-class feeling and design variation, had excellent appearance quality and therefore could enhance merchantability.

The appearance of mica varied depending upon the color tone of the base of the instrument display board 10, so that evaluation was carried out by viewing the instrument display board 10 only.

The instrument display board 10 was used as a solar cell time keeping instrument display board. As a result, the instrument display board 10 had a light transmittance of 20 to 40% contributing to power generation of a solar cell, and did not inhibit the function of the solar cell time keeping instrument itself.

The results of Example 1 to Example 6 are set forth in Table 1.

a light-transmitting substrate,
at least one partial print layer,
a different-color print layer having a color tone different from that of the partial print layer,
said partial print layer and said different-color print layer being provided on a back surface of the light-transmitting substrate,
the difference of the color of said partial print layer and said different-color print layer is visible by an incident light upon the instrument display board, and
a shield member which is provided at a position on a front surface of the light-transmitting substrate, said position corresponding to a position surrounding a part of the outer periphery of the partial print layer or the whole of the outer periphery of the partial print layer,
wherein the shield member is seen between the partial print layer and the different-color print layer when the instrument display board is viewed from a direction facing the front surface,
a portion of the light-transmitting substrate corresponding to the partial print layer is a transparent layer, and

TABLE 1

| | Light-transmitting substrate | | | Partial print layer | | |
|---|---|---|---|---|---|---|
| | Material | Transparent layer | Light-reflecting powder Mica | Material | Color tone (color tone No.) | Light-reflecting powder Mica |
| Ex. 01 | Polycarbonate resin | Gold | $TiO_2 + Fe_2O_3$ | Acrylic resin | Blue (18) | — |
| Ex. 02 | Polycarbonate resin | Colorless | — | Urethane resin | Blue (18) | — |
| Ex. 03 | Polycarbonate resin | Colorless | — | Acrylic resin | Yellowish orange (6) | — |
| Ex. 04 | Polycarbonate resin | Colorless | — | Urethane resin | Yellowish orange (6) | — |
| Ex. 05 | Polycarbonate resin | Colorless | — | Alkyd resin | Yellowish orange (6) | — |
| Ex. 06 | Acrylic resin | Colorless | — | Acrylic resin | Silver | $SnO_2 + TiO_2$ |

| | Different-color print layer | | | Shield member | |
|---|---|---|---|---|---|
| | Material | Color tone (color tone No.) | Light-reflecting powder Mica | Plating | Forming method |
| Ex. 01 | Acrylic resin | Yellowish orange (6) | — | Rhodium plating (Rh) | HMR (EF) |
| Ex. 02 | Urethane resin | Yellowish orange (6) | — | Gold plating (Aw) | HMR (EF) |
| Ex. 03 | Acrylic resin | Greenish blue (17) | $TiO_2$ | Gold plating (Aw) | HMR (EF) |
| Ex. 04 | Urethane resin | Greenish blue (17) | — | Gold plating (Aw) | Printing (EF) |
| Ex. 05 | Alkyd resin | Bluish green (13) | — | Black color plating | Printing (EF) |
| Ex. 06 | Acrylic resin | Blue (18) | — | Rhodium plating (Rh) | Etching (bonding) |

| | Pattern | | | | |
|---|---|---|---|---|---|
| | Portion inside the shield member | | Other portions | | |
| | Front surface | Back surface | Front surface | Back surface | Impressions |
| Ex. 01 | Present | — | Present | — | A stereoscopic feeling was presented, and design properties were excellent. |
| Ex. 02 | Present | Present | Present | Present | A stereoscopic feeling was presented, and design properties were excellent. |
| Ex. 03 | Present | — | Present | — | A stereoscopic feeling was presented, and design properties were excellent. |
| Ex. 04 | Present | — | Present | — | A stereoscopic feeling was presented, and design properties were excellent. |
| Ex. 05 | — | — | — | — | A stereoscopic feeling was presented, and design properties were excellent. |
| Ex. 06 | Present | — | Present | — | A stereoscopic feeling was presented, and design properties were excellent. |

The invention claimed is:

1. An instrument display board comprising:

the shield member is fixed to the front surface of the light-transmitting substrate through an adhesive or a pressure-sensitive adhesive.

2. The instrument display board as claimed in claim 1, wherein all of the light-transmitting substrate is a transparent layer.

3. The instrument display board as claimed in claim 2, wherein the transparent layer of the light-transmitting substrate is a colorless transparent layer.

4. The instrument display board as claimed in claim 2, wherein the transparent layer of the light-transmitting substrate is a colored transparent layer.

5. The instrument display board as claimed in claim 1, wherein the light-transmitting substrate is a first transparent layer, and a second transparent layer having a color tone different from that of the first transparent layer is partially provided on the front surface of the light-transmitting substrate.

6. The instrument display board as claimed in claim 1, wherein on the front surface of the light-transmitting substrate, at least one pattern is provided.

7. The instrument display board as claimed in claim 1, wherein on the back surface of the light-transmitting substrate, at least one pattern is provided.

8. The instrument display board as claimed in claim 6, wherein the pattern provided on the light-transmitting substrate is a partial pattern provided on a part of the light-transmitting substrate.

9. The instrument display board as claimed in claim 8, wherein the partial pattern is provided at a portion corresponding to the partial print layer.

10. The instrument display board as claimed in claim 1, wherein the different-color print layer is provided so as to cover the partial print layer and other portion on the back surface of the light-transmitting substrate.

11. The instrument display board as claimed in claim 1, wherein the different-color print layer is provided at a portion other than the partial print layer on the back surface of the light-transmitting substrate.

12. The instrument display board as claimed in claim 11, wherein the different-color print layer is provided so as to be in contact with the outer periphery of the partial print layer on the back surface of the light-transmitting substrate.

13. The instrument display board as claimed in claim 1, wherein the color tone relationship between the partial print layer and the different-color print layer is a relationship of complimentary colors.

14. The instrument display board as claimed in claim 1, wherein on the light-transmitting substrate, a display print layer is provided.

15. The instrument display board as claimed in claim 1, wherein on the shield member, a display print layer is provided.

16. The instrument display board as claimed in claim 14, wherein the display print layer is provided using inks of different color tones in such a manner that these inks partially overlap each other.

17. The instrument display board as claimed in claim 14, wherein the display print layer is provided using inks of different color tones in such a manner that these inks are partially in contact with each other.

18. A timepiece instrument display board comprising:
a light-transmitting substrate,
at least one partial print layer,
a different-color print layer having a color tone different from that of the partial print layer,
said partial print layer and said different-color print layer being provided on a back surface of the light-transmitting substrate,
the difference of the color of said partial print layer and said different-color print layer is visible by an incident light upon the instrument display board, and
a shield member which is provided at a position on a front surface of the light-transmitting substrate, said position corresponding to a position surrounding a part of the outer periphery of the partial print layer or the whole of the outer periphery of the partial print layer,
wherein the shield member is seen between the partial print layer and the different-color print layer when the instrument display board is viewed from a direction facing the front surface,
a portion of the light-transmitting substrate corresponding to the partial print layer is a transparent layer, and
the shield member is fixed to the front surface of the light-transmitting substrate through an adhesive or a pressure sensitive adhesive.

19. The instrument display board as claimed in claim 1, wherein a light refractive index of the light-transmitting substrate and a light refractive index of the shield member are different.

20. A display board for a watch comprising:
a light-transmitting substrate,
at least one partial print layer,
a different-color print layer having a color tone different from that of the partial print layer,
said partial print layer and said different-color print layer being provided on a back surface of the light-transmitting substrate,
the difference of the color of said partial print layer and said different-color print layer is visible by a reflection of incident light upon the display board from a visible side of the watch, and
a shield member which is provided at a position on a front surface of the light-transmitting substrate, said position corresponding to a position surrounding a part of the outer periphery of the partial print layer or the whole of the outer periphery of the partial print layer,
wherein the shield member is seen between the partial print layer and the different-color print layer when the instrument display board is viewed from a direction facing the front surface,
a portion of the light-transmitting substrate corresponding to the partial print layer is a transparent layer.

* * * * *